(12) United States Patent
Chiang

(10) Patent No.: US 11,368,418 B2
(45) Date of Patent: *Jun. 21, 2022

(54) DETERMINING WHEN TO PARTITION REAL TIME TEXT CONTENT AND DISPLAY THE PARTITIONED CONTENT WITHIN SEPARATE CONVERSATION BUBBLES

(71) Applicant: T-Mobile USA, Inc., Bellevue, WA (US)

(72) Inventor: Hsin-Fu Henry Chiang, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/544,287

(22) Filed: Aug. 19, 2019

(65) Prior Publication Data

US 2019/0372917 A1 Dec. 5, 2019

Related U.S. Application Data

(63) Continuation of application No. 15/828,322, filed on Nov. 30, 2017, now Pat. No. 10,404,632.

(Continued)

(51) Int. Cl.
*G06F 15/16* (2006.01)
*H04L 51/04* (2022.01)
(Continued)

(52) U.S. Cl.
CPC .............. *H04L 51/04* (2013.01); *H04L 67/06* (2013.01); *H04W 4/12* (2013.01); *H04W 68/005* (2013.01)

(58) Field of Classification Search
None
See application file for complete search history.

(56) References Cited

U.S. PATENT DOCUMENTS 6,212,548 B1 4/2001 DeSimone et al.
6,301,484 B1 10/2001 Rogers et al.
(Continued)

FOREIGN PATENT DOCUMENTS

CN 101427231 A 5/2009
CN 104159203 A 11/2014
(Continued)

OTHER PUBLICATIONS

Office Action for U.S. Appl. No. 16/203,502, dated Mar. 5, 2020, Chiang, "Word-by-Word Transmission of Real Time Text", 10 pages.

(Continued)

*Primary Examiner* — Phuoc H Nguyen
(74) *Attorney, Agent, or Firm* — Lee & Hayes, P.C.

(57) ABSTRACT

A first user equipment (UE)—during a real time text (RIT) communication session with a second UE—may make a control function available to a local user of the first UE, who may invoke the control function to break up his/her RTT content within organized conversation bubbles. In an example process, after displaying first text character(s)—which was input by the local user—within a first conversation bubble designated for the first UE (or the local user thereof), the first UE may detect an invocation of the control function, followed by additional user input requesting to type one or more second text characters. Invocation of the control function prior to the additional user input requesting to type the second text character(s) may cause the first UE to display the second text character(s) within a second conversation bubble designated for the first UE, rather than the first conversation bubble.

20 Claims, 14 Drawing Sheets

Related U.S. Application Data

(60) Provisional application No. 62/531,732, filed on Jul. 12, 2017, provisional application No. 62/564,873, filed on Sep. 28, 2017.

(51) Int. Cl.
*H04L 67/06* (2022.01)
*H04W 68/00* (2009.01)
*H04W 4/12* (2009.01)

(56) References Cited

U.S. PATENT DOCUMENTS

| | | |
|---|---|---|
| 6,636,590 B1 | 10/2003 | Jacob et al. |
| 8,331,541 B1 | 12/2012 | Smith |
| 9,602,559 B1 | 3/2017 | Barros et al. |
| 2003/0041302 A1 | 2/2003 | McDonald |
| 2003/0140145 A1* | 7/2003 | Lindberg ............... H04M 7/006 709/227 |
| 2003/0158734 A1 | 8/2003 | Cruickshank |
| 2003/0236901 A1* | 12/2003 | Barazesh ................ H04M 1/24 709/230 |
| 2004/0111475 A1 | 6/2004 | Schultz |
| 2005/0204282 A1 | 9/2005 | Harutunian et al. |
| 2005/0235031 A1 | 10/2005 | Schneider et al. |
| 2008/0133675 A1 | 6/2008 | Ramanathan et al. |
| 2009/0013265 A1 | 1/2009 | Cole et al. |
| 2011/0010657 A1 | 1/2011 | FitzGerald et al. |
| 2012/0034938 A1 | 2/2012 | Kreitzer et al. |
| 2012/0162350 A1 | 6/2012 | Lee et al. |
| 2012/0197770 A1 | 8/2012 | Raheja et al. |
| 2012/0254456 A1 | 10/2012 | Visharam et al. |
| 2012/0303452 A1 | 11/2012 | Xue et al. |
| 2013/0046582 A1 | 2/2013 | Ramer et al. |
| 2014/0072945 A1 | 3/2014 | Gu et al. |
| 2014/0108568 A1 | 4/2014 | Lee |
| 2014/0143684 A1 | 5/2014 | Oh et al. |
| 2015/0381666 A1 | 12/2015 | Rustogi |
| 2016/0014059 A1 | 1/2016 | Rathod |
| 2016/0095056 A1 | 3/2016 | Lebon-Schneider et al. |
| 2016/0100298 A1 | 4/2016 | Peterson |
| 2016/0277329 A1 | 9/2016 | Gordon et al. |
| 2016/0283109 A1 | 9/2016 | Langholz |
| 2016/0301723 A1 | 10/2016 | Sinclair et al. |
| 2016/0359779 A1 | 12/2016 | Shi |
| 2017/0085506 A1 | 3/2017 | Gordon |
| 2019/0020607 A1 | 1/2019 | Chiang |
| 2019/0068658 A1* | 2/2019 | Chiang ................... H04L 65/80 |
| 2020/0133814 A1* | 4/2020 | Prabath ............... G06F 11/0772 |

FOREIGN PATENT DOCUMENTS

| | | |
|---|---|---|
| CN | 104408042 A | 3/2015 |
| KR | 20160020892 A | 2/2016 |
| WO | WO2012018996 A1 | 2/2012 |

OTHER PUBLICATIONS

PCT Search Report and Written Opinion for PCT Application No. PCT/US2018/039806, dated Oct. 26, 2018, 13 pages.

PCT Search Report & Written Opinion for Application No. PCT/US2019/062001, dated Apr. 10, 2020, 11 pgs.

Extended European Search Report for European Patent Application No. 18831825.7, dated Feb. 18, 2021, 11 pages.

* cited by examiner

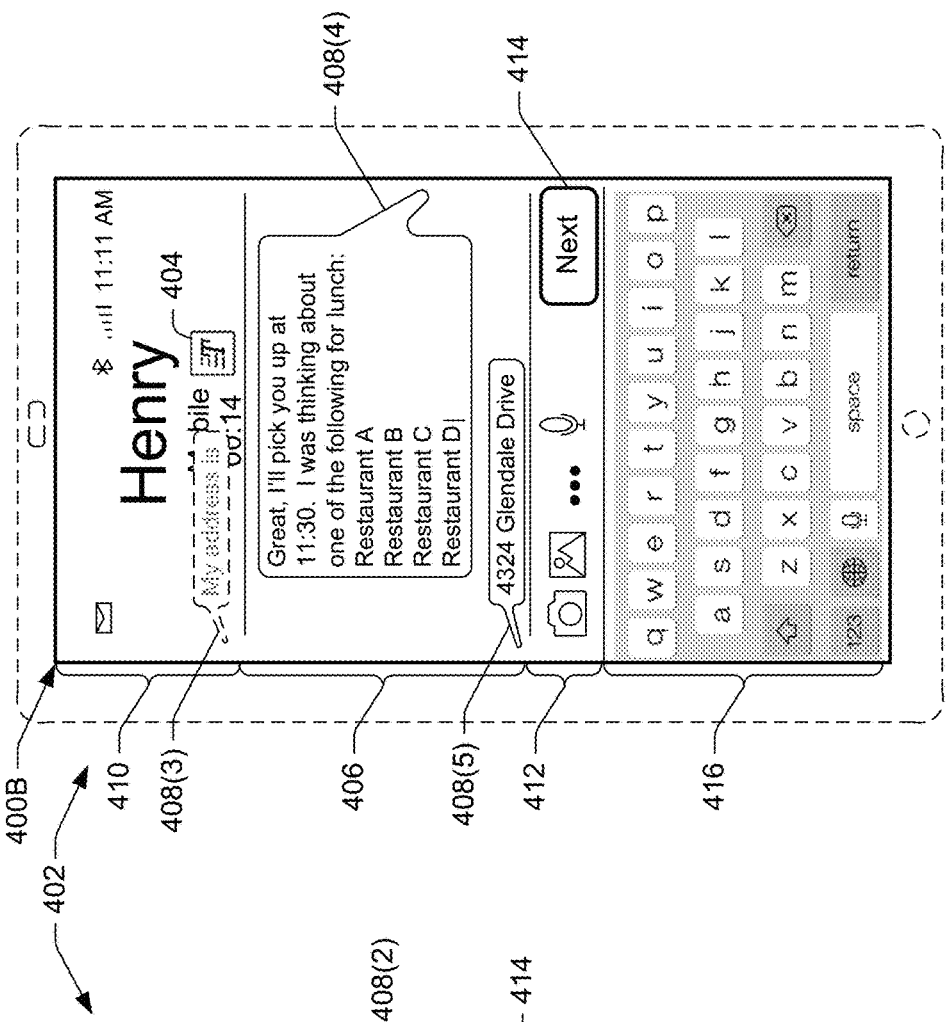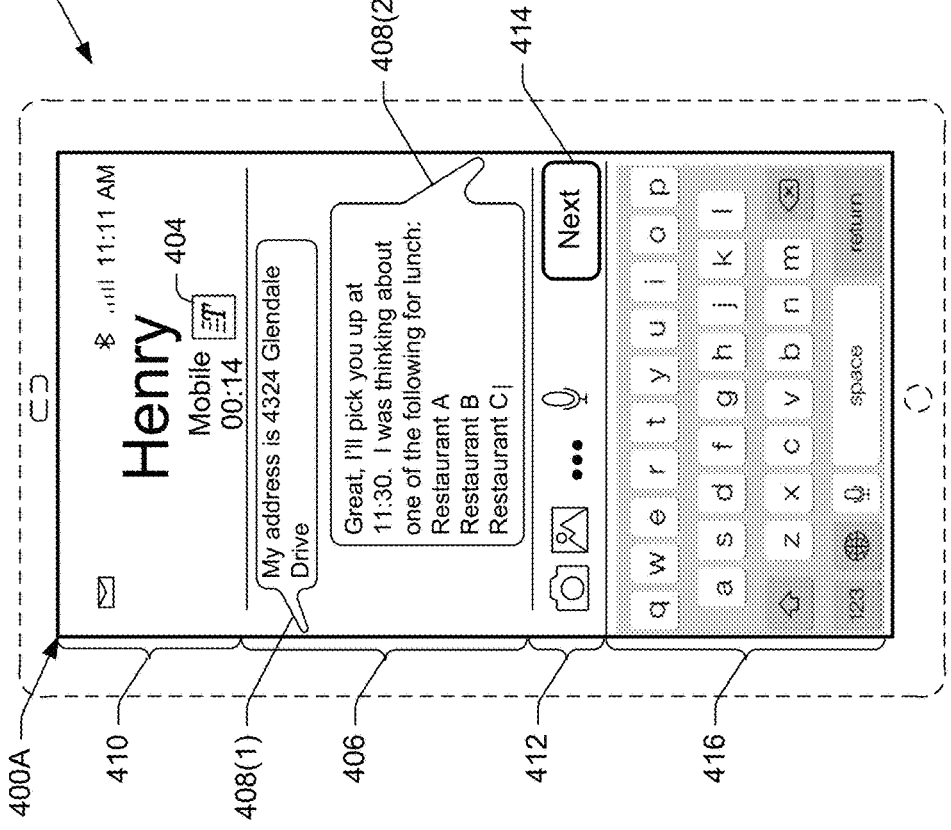
FIG. 4

DETERMINING WHEN TO PARTITION REAL TIME TEXT CONTENT AND DISPLAY THE PARTITIONED CONTENT WITHIN SEPARATE CONVERSATION BUBBLES

CROSS REFERENCE TO RELATED APPLICATIONS

This application is a continuation of, and claims priority to, commonly-owned, U.S. patent application Ser. No. 15/828,322, filed on Nov. 30, 2017, which claims priority filing benefit from U.S. Provisional Patent Application No. 62/531,732, filed Jul. 12, 2017, and to U.S. Provisional Patent Application No. 62/564,873, filed Sep. 28, 2017. Application Ser. Nos. 15/828,322, 62/531,732, and 62/564,873 are fully incorporated herein by reference.

BACKGROUND

Real time text (RT) allows for a near instantaneous transmission of text content between Internet Protocol (IP)-based terminals. As a user of a source device types a RTT message, the text content of the RTT message is (without providing a "send" button for the user to select) transmitted to, and displayed on, a destination device in real-time. The transmission of text content can occur character-by-character such that the user of the destination device may see each character appear on the display of the destination device in real-time, as the characters are typed by the user of the source device. This near instantaneous transmission of text content resembles a more natural conversation that is preferred by the hearing and speech impaired over traditional text messaging (e.g., Short Message Service (SMS) text). However, this near instantaneous transmission of text content can also cause challenges in presenting the text content on a display in a way that is user-friendly and easy for a user to visually follow the written conversation.

For instance, if RIT content is to be displayed within conversation bubbles using a "strictly sequential" approach for displaying text characters as they are received by the device (either through direct user input or over a network from another device), the resulting written conversation may be displayed in an overly interrupted or fragmented manner that is difficult, if not impossible, to follow. Using this strictly sequential approach, phrases, and even individual words, may be fragmented across the display in multiple conversation bubbles, rendering words illegible and phrases difficult to piece together. For example, text characters of a single word may be distributed across different conversation bubbles on the display because each party of the conversation may be typing at nearly the same time, interrupting the other party's thought. In an extreme example, during a RTT session between User A and User B, User A may type a text character of a word, which is displayed in a first conversation bubble at the top of the screen, which is followed by User B typing a text character of a word, which is displayed in a different conversation bubble below User A's first conversation bubble, which is followed by User A typing yet another text character of the same, original word, which is displayed in yet another conversation bubble below User B's conversation bubble, and so on and so forth. It can be appreciated that a written RTT conversation can appear extremely fragmented and illegible on a display using a strictly sequential approach, as described above. At the other extreme, if each user's RTT content were to be displayed in a single conversation bubble designated for each user, the written conversation would lose its natural back-and-forth sequence, which, in its own right, makes the written conversation difficult, if not impossible to follow on a display.

Traditional messaging applications, like SMS, do not experience these challenges because text content of traditional messaging applications is not transmitted over the network unless and until a user selects the "send" button. Thus, in traditional messaging applications (i.e., non-RTT messaging applications) a user can type out a complete thought before deciding to select the "send" button. Upon selecting the send button, a conversation bubble is created containing the user's complete thought. In RT communication sessions, the omission of this "send" button, coupled with the fact that text content is transmitted in real-time (i.e., near instantaneous transmission of text content), without user intervention, presents unique challenges to presenting a written RT conversation using conversation bubbles such that the written conversation is easy for a user to visually follow on a display.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

FIG. 4 illustrates example user interfaces that may be presented on a display of a UE during a RTT communication session in two different scenarios, according to yet another embodiment. Scenario A of FIG. 4 illustrates a case where active conversation bubbles are contained within a displayable area on the display when a second portion of text typed by a remote user is received. Scenario B illustrates a case where an active conversation bubble designated for the remote user is moved outside of the displayable area, causing the second portion of the remote user's text to be displayed in a separate conversation bubble.

DETAILED DESCRIPTION

Figure 1:
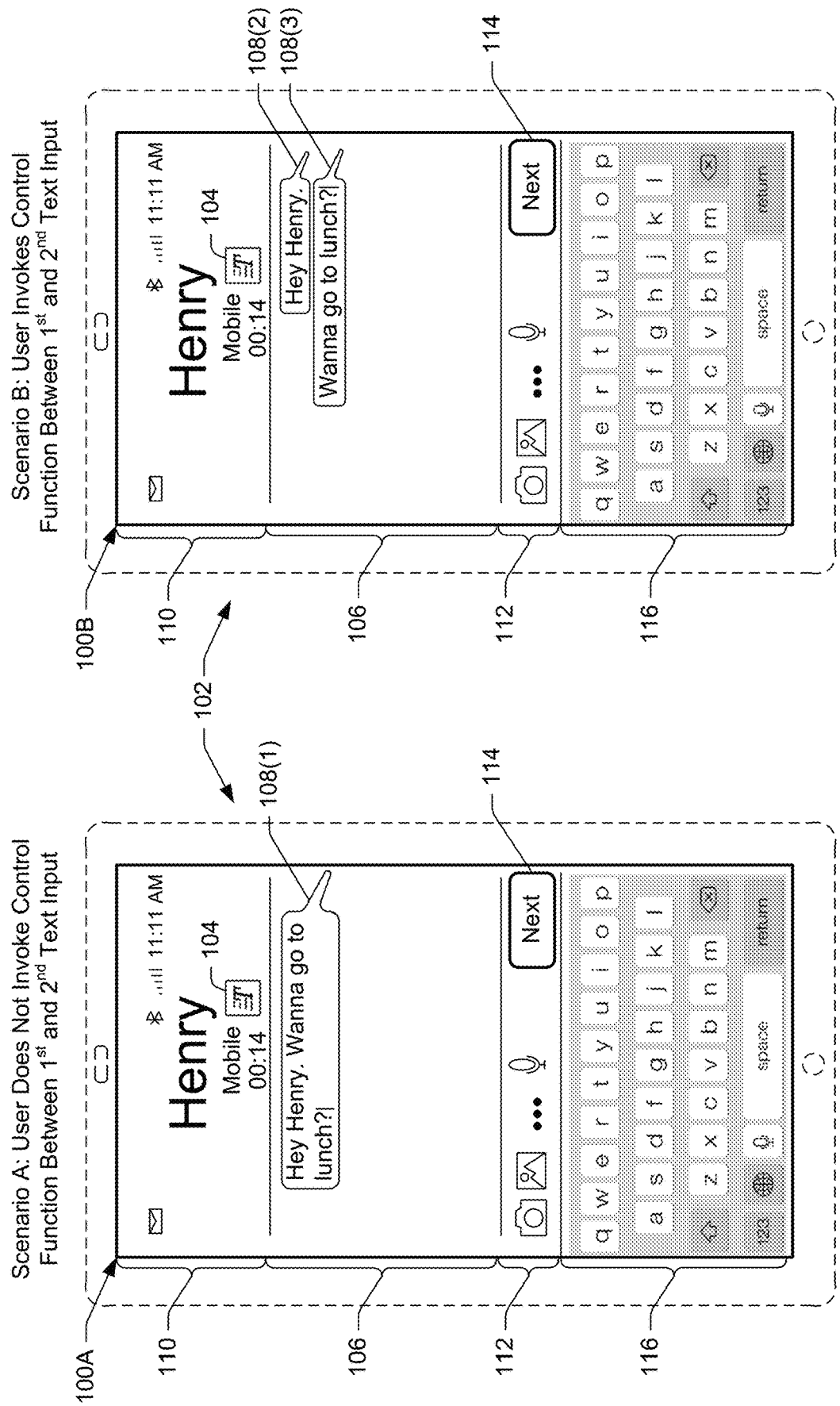
FIG. 1 illustrates example user interfaces that may be presented on a display of a user equipment (UE) during a real time text (RTT) communication session in two different scenarios, Scenario A illustrating a case where a local user does not invoke a control function between inputting a first portion of text and a second portion of the text, and Scenario B illustrating a case where the local user invokes the control function between inputting the first and second portions of text. The invocation of the control function in Scenario B causes the text to be broken up between two separate conversation bubbles in Scenario B.

Described herein are, among other things, techniques and systems for controlling when and how real time text (RT) content is partitioned and displayed within conversation bubbles on a display of a user equipment (UE). RIT allows users to enter content (e.g., by typing text content) at a UE, and the UE is configured to display the content on a display, as well as transmit the content, in real-time, to another UE for display thereon. For instance, a first UE may display text content that is input by a local user within a conversation bubble(s) designated for the first UE (or the local user thereof), while displaying text content received from a second, remote UE within a conversation bubble(s) designated for the second UE (or the remote user thereof). Described herein are control mechanisms that can be utilized by a UE, such as the first UE and/or the second UE, in order to partition the RIT content exchanged during a RIT communication session so that the RTT content can be organized in a logical manner within conversation bubbles on a display.

One such control mechanism may comprise a control function that a UE makes available to a local user thereof, and which may be invoked (e.g., selected) by the local user in order to partition his/her RTT content and display the portioned content within separate, organized conversation bubbles. This may occur locally on the UE of the local user, and the UE of the local user may also be configured to notify a second UE (of the remote user) to display the local user's RIT content in the same, or a similar, way on the second UE. This lets the local user dictate when and how his/her RT content is to be broken up among separate conversation bubbles in a written conversation presented on a display. In an example process, after displaying a first text character(s)—which was input by the local user—within a first conversation bubble designated for the first UE (or the local user thereof), the first UE may detect user input requesting invocation of the control function, followed by additional user input requesting to type one or more second text characters. Invocation of the control function prior to detecting the additional user input requesting to type the second text character(s) may cause the first UE to display the second text character(s) within a second conversation bubble designated for the first UE, rather than displaying the second text character(s) within the first conversation bubble that contains the first text character(s).

By providing the user with a control function usable to partition RTT content so that it is displayed within separate, organized conversation bubbles, the user can dictate when and how RT content (e.g., text content) is broken up amongst conversation bubbles on the display. In the above example, the local user invoked the control function in order to display the first text character(s) and the second text character(s) in respective conversation bubbles on the display. In this manner, a written conversation can be presented in a way that is legible and easy for a user to follow (e.g., to determine who said what, and when it was said during the conversation) without fragmenting individual words across multiple conversation bubbles, and while still preserving the natural back-and-forth sequence of the conversation.

In some embodiments, the first UE may be configured to determine a presence, on the display of the first UE, of a conversation bubble designated for the second UE (or the remote user thereof) before allowing a local user's invocation of the control function to cause the local user's text content to be partitioned and displayed in separate conversation bubbles designated for the first UE (or the local user thereof). In this embodiment, and continuing with the above example, the first UE may be configured to display the second text character(s) within the second conversation bubble designated for the first UE (or the local user thereof) if two conditions are met at a time when the local user inputs the second text character(s). The first condition to be met in this example is that the control function has been invoked by the local user prior to the local user inputting the second text character(s). The second condition to be met in this example is that an active conversation bubble designated for the second UE (or the remote user thereof) is present on the display at a time when the local user inputs the second text character(s). If these two conditions are not met at a time when the local user inputs the second text character(s), the first UE may be configured to display the second text character(s) within the same, first conversation bubble that contains the first text character(s). This additional control mechanism may be utilized for finer-tuned control over when and how RT content is to be partitioned amongst separate conversation bubbles.

It is to be appreciated that the techniques and systems described herein may improve the display functionality of a computing device (e.g., a UE), as compared to existing methods of displaying RTI content during a RTI communication session. As noted above, following a "strictly sequential" approach to displaying RTT content can result in an overly fragmented presentation of content, rendering text content illegible in some cases. At the other extreme, displaying all of a user's RTT content in a single conversation bubble designated for that user loses the natural back-and-forth of a conversation, making it difficult to follow along with the written conversation (i.e., determine who said what, and when it was said during the conversation). The techniques and systems described herein allow for logically breaking up RTT content within organized conversation bubbles so that a user can easily, and intuitively, follow along with a written conversation during a RTT communication session. The techniques and systems described herein may further allow one or more devices to conserve resources with respect to communications bandwidth resources, processing resources, memory resources, power resources, and/ or other resources. Additional technical effects can also be realized from an implementation of the technologies disclosed herein.

Also described herein are systems and devices comprising one or more processors and one or more memories, as well as non-transitory computer-readable media storing computer-executable instructions that, when executed, by one or more processors perform various acts and/or processes disclosed herein.

FIG. 1 illustrates example user interfaces 100A and 100B that may be presented on a display of a user equipment (UE) 102 during a real time text (RTT) communication session in two different scenarios, labeled Scenario A and Scenario B in FIG. 1.

In accordance with various embodiments described herein, the terms "user equipment (UE)," "communication device," "device," "wireless communication device," "wireless device," "mobile device," "terminal," "wireless terminal," "mobile terminal," and "client device." may be used interchangeably herein to describe any UE, such as the UE 102, that is capable of transmitting/receiving data, wirelessly and/or over wired networks, using any suitable communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.1x protocols, WiMAX, Wi-Fi, Data Over Cable Service Interface Specification (DOCSIS), digital subscriber line (DSL), and/or any future IP-based network technology or evolution of an existing IP-based network technology.

Furthermore, the UE 102 may be implemented as any suitable type of communication device configured to communicate over a telecommunications network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), an in-vehicle (e.g., in-car) computer, and/or any similar communication device. In addition, the UE 102 may be a mobile device, or it may be non-mobile (or situated) communication devices including, without limitation, a television (smart television), a set-top-box (STB), a game console, a desktop computer, and the like.

In the example of FIG. 1, the UE 102 may represent a first UE 102 that has established a RT communication session with a second UE (not shown in FIG. 1). In this sense, the first UE 102 may represent an originating UE if a local user of the first UE 102 initiated the RIT session request (e.g., if the local user selected a RTT call button to call a remote user), or, alternatively, the first UE 102 may represent a terminating UE if the local user accepted an incoming RT session request initiated by the remote user (e.g., if the local user answered an incoming RTT call from the remote user).

It is to be appreciated that the local user of the first UE 102 in FIG. 1 may be a subscriber to telecommunications services, such as Internet Protocol Multimedia Subsystem (IMS)-based services. These IMS-based services may be provided by a wireless carrier (sometimes referred to as an "operator") that maintains and/or operates a telecommunications network over which the services may be provided to subscribers via associated UEs. The wireless carrier may offer various services to subscribers, at least some of which include RTT-based services, such as RIT calling services, RT video calling services, and the like. These RT-based services can be distinguished from non-RT services (e.g., traditional telephony services, such as voice-only, VoLTE calling services) because RTF-based services include a real-time text component for RT content to be exchanged via a RTT media stream, and non-RTT services do not include this RTT component for the session. A RTT communication session allows the multiple parties of the session to type concurrently (e.g., allowing one user to interrupt the other user), and RTT can be implemented as an add-on to voice, which enables simultaneous voice and RTT media streams. A voice call that allows for the transmission of text (and/or image, video, etc.) content in real-time via an RTT media stream (in parallel with voice) is sometimes referred to as a "RTT call."

Referring again to FIG. 1, the local user of the first UE 102 may have explicitly requested an RT-based session by virtue of selecting an appropriate soft button (e.g., a "RTT call" soft button), or the local user may have initially requested a non-RT-based session (e.g., a VoLTE call), and subsequently upgraded to an RTT-based session. Alternatively, the local user of the first UE 102 may have received, and accepted, a RTT call from a remote user (the remote user in FIG. 1 having the name "Henry," as shown in the user interfaces 100A/B). Both of the user interfaces 100A and 100B are shown as including various elements that make up an "in-progress RT call" user interface. For example, a RTT icon 104 may be presented in the user interfaces 100A/B to indicate to the local user that the current session is a RTT-based communication session (e.g., a RTT call), as opposed to a non-RT, voice-only call. The user interfaces 100A/B may each include a RTT conversation area 106 where at least a portion of a written conversation may be displayed during a RTT communication session. The RTT conversation area 106 may have a defined boundary that is dynamically resizable. Conversation bubbles 108 can be presented within the defined boundary of the RTT conversation area 106, and in this sense, the RTT conversation area 106 may be displayable area where conversation bubbles 108 can be displayed, and outside of which, conversation bubbles 108 cannot be displayed.

The example of FIG. 1 shows an example upper boundary of the RT conversation area 106 as being located just below an upper portion 110 of the user interface 100A/B where information such as the caller identity, session time, and other notification icons may be displayed. An example lower boundary of the RT conversation area 106 may be located just above a middle portion 112 of the user interface 100A/B where enhanced content icons and a selectable control function element 114 (sometimes referred to as "selectable element" 114 or "control function" 114) may be displayed. The example side boundaries of the RTT conversation area 106 may be located at or near an outermost part of the electronic display. A soft keyboard 116 may be displayed below the RTT conversation area 106 (and below the middle portion 112 containing the enhanced content icons and selectable control function element 114. The soft keyboard 116 may be usable—along with a touch screen input device (e.g., a capacitive or resistive touch-sensing element—to allow a user to type text characters of a RTT message. It is to be appreciated that the size of the RT conversation area 106 may be dynamically resized, such as by collapsing the soft keyboard 116 when the local user does not need to type anything. Collapsing the soft keyboard 116 may therefore increase the size of the RTT conversation area 106, while expanding the soft keyboard 116 from a collapsed state may decrease the size of the RT conversation area 106, as compared to the relatively larger size of the RT conversation area 106 before the expanding of the soft keyboard 116.

The conversation bubbles 108 that are displayed within the RT conversation area 106 may include RTT content, such as text content (e.g., text characters), that is input by the local user, as well as RTT content that is received in packets from the second UE over a telecommunications network. As used herein, "RT content" refers to any suitable type of digital content that can be exchanged via a RT media stream during a RT communication session, such as a RTT call. Although text content (e.g., typographical text characters, such as letters, numbers, words, phrases, symbols, etc.) is an exemplary type of RTT content that can be exchanged via RT packets, it is to be appreciated that other types of RTT content can include, without limitation, image content (e.g., digital pictures, photos, etc.), video content, multimedia content, graphical content, geolocation content (e.g., a digital map indicating a geographic location of a UE), contacts/address book content, calendar content, recorded audio content (e.g., audio clips), and/or other types of digital files that include content. For example, the local user of the first UE 102 may select an enhanced content icon within the middle portion 112 of the user interface 100A/B in order to insert image content, video content, audio content, text content converted from speech-to-text, or the like. Many of the examples described herein are provided with respect to text content for ease of illustration, although it is to be appreciated that RTT content is not limited to text content.

In Scenario A of FIG. 1 (Scenario A shown on the left side of FIG. 1), the local user of the first UE 102 does not select the selectable element 114 (i.e., does not invoke the control function) while entering text content of a RTF message. When the local user types the first text character "H" of the word "Hey," the first UE 102 may respond to this user input by creating the conversation bubble 108(1) and displaying the conversation bubble 108(1) within the RTT conversation area 106 (e.g., at a top right corner of the RIT conversation area 106). The first UE 102 may also display the first text character "H" within the conversation bubble 108(1), the display of the first text character occurring immediately after the local user types the first text character. The local user may perceive this as the text content appearing within the conversation bubble 108(1) as he/she is typing the text characters of a RTT message. The conversation bubble 108(1) may use any suitable visual indication to indicate that the first conversation bubble 108(1) is designated for the first UE 102 (or the local user thereof), as opposed to the second UE or the remote user thereof. In FIG. 1, the first UE 102 is shown as aligning the conversation bubble 108(1) with a particular (e.g., the right) side of the RTT conversation area 106 to indicate that the right-aligned conversation bubble 108(1) is designated for the first UE 102 (or the local user thereof). The first UE 102 may be configured to align conversation bubbles 108 designated for the second UE (or the remote user thereof) with the opposite (e.g., the left) side of the RT conversation area 106 to indicate that those left-aligned conversation bubbles 108 are designated for the second UE (or the remote user thereof). FIG. 1 does not depict any left-aligned conversation bubbles 108 that would be designated for the second UE (or the remote user thereof). Other visual indicators, such as color schemes, symbols, tags, identifiers, and the like, may be utilized as an alternative to, or in combination with, the left-aligned, right-aligned scheme, to associate conversation bubbles 108 with devices and/or users participating in the session/conversation.

In Scenario A of FIG. 1, as the local user continues to type the text characters of the RTT message (e.g., "e", followed by "y", followed by "space", followed by "H", and so on), the text characters typed by the local user may be displayed within the conversation bubble 108(1) that was initially created when the first text character "H" was typed by the local user. Because the local user in Scenario A does not invoke the control function 114 (e.g., does not select the selectable element 114), the entire message (all of the text characters) may be contained within the single conversation bubble 108(1) in Scenario A.

By contrast, Scenario B of FIG. 1 illustrates a case where the local user of the first UE 102 invokes the control function (e.g., by selecting the selectable element 114) between inputting a first portion of text content (e.g., "Hey Henry.") and a second portion of text content (e.g., "Wanna go to lunch?"). In Scenario B, when the local user types the first text character "H" of the word "Hey," the first UE 102 may respond to this user input by creating the conversation bubble 108(2) and displaying the conversation bubble 108(2) within the RTT conversation area 106. The first UE 102 may also display the first text character "H" within the conversation bubble 108(2), the display of the first text character occurring immediately after the local user types the first text character. Again, the first UE 102 is shown as aligning the conversation bubble 108(2) with a particular (e.g., the right) side of the RTT conversation area 106 to indicate that the right-aligned conversation bubble 108(2) is designated for the first UE 102 (or the local user thereof), as opposed to the second UE (or the remote user thereof).

In Scenario B, as the local user continues to type the text characters of the RTT message (e.g., "e", followed by "y", followed by "space", followed by "H", and so on), the text characters may be displayed within the conversation bubble 108(2) that was initially created when the first text character "H" was typed by the local user. In Scenario B, however, after the local user types the text punctuation character "." following the word "Henry", the local user invokes the control function 114 by selecting the selectable element 114. The selectable element 114 is shown in FIG. 1, by way of example, in the form of a "Next" soft button displayed below the RTT conversation area 106. The first UE 102 may detect, and register, the user's invocation of the control function 114, and in response to the local user subsequently typing the text character "W" of the word "Wanna", the first UE 102 may create a second conversation bubble 108(3) and display the second conversation bubble 108(3) below the first conversation bubble 108(2) within the RTT conversation area 106. The first UE 102 may also display the text character "W" within the second conversation bubble 108(3), the display of the text character "W" occurring immediately after the local user types the text character "W". The second conversation bubble 108(3) is designated for the first UE 102 (or the local user thereof) because it is aligned with a particular (e.g., the right) side of the RTT conversation area 106, but this may be indicated visually in other ways, as described herein. In any case, the local user can invoke the control function 114 to break up the text content of the RTT message into two portions of text content, which are displayed within respective conversation bubbles 108(2) and 108(3); namely, a first portion of text content (e.g., "Hey Henry.") displayed within the first conversation bubble 108(2) and a second portion of text content (e.g., "Wanna go to lunch?") displayed within the second conversation bubble 108(3).

Although touch-based input can be utilized to input (e.g., type) text characters, touch-based typing of text characters is merely one exemplary form of user input that may be utilized in order to input text content of a RTT message. Accordingly, it is to be appreciated that a user may utilize other forms of input, such as voice input (detected via a microphone of the first UE 102) to input text characters. In Scenario B, for example, the first UE 102 may include voice recognition software to transform speech that is detected by the microphone(s) of the first UE 102 into text, which may allow the local user to utter the phrase "Hey Henry," followed by the user uttering the word "Next" (to invoke the control function 114), followed by the user uttering the phrase "Wanna go to lunch?".

FIG. 1 also shows one illustrative example of a selectable element 114 (e.g., a "Next" soft button) that can be used to invoke the control function 114 that causes text content of an RTT message to be partitioned at a particular point in a passage of text, and to be displayed in separate conversation bubbles 108. Other example types of selectable control function elements 114 may include, without limitation, a soft button with the letter(s)/word(s) "Done", "NB" [Next Bubble], "Finished", "Complete", "Enter", "Return", "CR" [Carriage Return], "LF" [Line Feed], "GA" [Go Ahead], "SK" [Stop Keying], "GA to SK", "NL" [Next Line], or similar graphics, icons, symbols, and the like. The control function 114 may also be invoked by selection of a "hard" button (instead of a soft button), such as a physical key on the UE 102, or any other suitable input mechanism (e.g., voice input).

Figure 2:
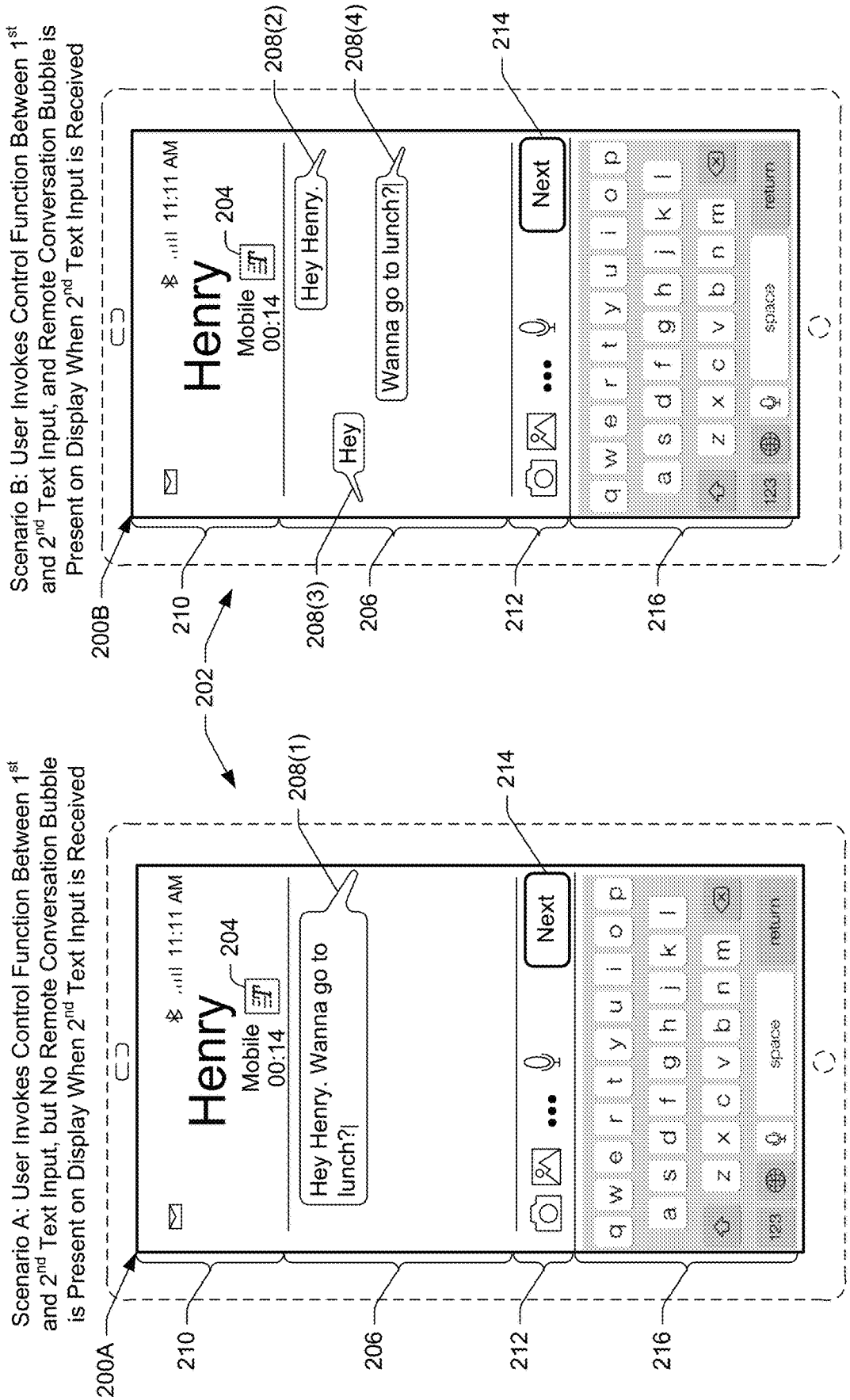
FIG. 2 illustrates example user interfaces that may be presented on a display of a UE during a RTT communication session in two different scenarios, according to another embodiment. Scenario A of FIG. 2 illustrates a case where a local user invokes a control function between inputting a first portion of text and a second portion of the text, but the UE does not receive any text from a remote user during this time. Scenario B of FIG. 2 illustrates a case where the local user invokes the control function between inputting the first and second portions of text, and text typed by a remote user is also received between the inputting of first and second portions of text by the local user, which causes the local user's text to be broken up between two separate conversation bubbles in Scenario B.

FIG. 2 illustrates example user interfaces 200A and 200B that may be presented on a display of a UE 202 during a RTT communication session in two different scenarios, according to another embodiment. FIG. 2 illustrates a conversation bubble "presence detection" control mechanism that can be utilized independently, and/or in combination with any of the other control mechanisms described herein (such as the selectable control function element 214). As shown in Scenario B of FIG. 2 (Scenario B shown on the right side of FIG. 2), the first UE 202 may be configured to partition text content of a RTT message that was input by a local user of the first UE 202, and display the partitioned text content in separate conversation bubbles 208 if two conditions are met at a time when the local user inputs the a second portion of the text content. The first condition (which is met in both Scenarios A and B of FIG. 2) is that the control function 214 has been invoked (e.g., selectable element 214 selected) by the local user prior to the local user inputting a second portion of text content (e.g., "Wanna go to lunch?" in FIG. 2). The second condition (which is met in Scenario B of FIG. 2, but not Scenario A) is that an active conversation bubble 208(3) designated for the second UE (or the remote user thereof) is present (e.g., actively displayed) on the display of the first UE 202 at a time when the local user inputs the second portion of text content (e.g., "Wanna go to lunch?" in FIG. 2). Scenario A illustrates a case where one these two conditions is not met at a time when the local user inputs the second portion of text content (e.g., "Wanna go to lunch?" in FIG. 2). For example, the local user in Scenario A may type out the text characters for "Hey Henry.", followed by a selection of the selectable element 214 to invoke the control function, followed by an entry of the text characters for "Wanna go to lunch?". However, because the remote user in Scenario A did not type anything between the first portion of text content (e.g., "Hey Henry." in FIG. 2) and the second portion of text content (e.g., "Wanna go to lunch?" in FIG. 2), there is no actively displayed conversation bubble 208 designated for the second UE (or the remote user thereof) in the user interface 200A at a time when the local user types "Wanna go to lunch?". Because the second condition of the above two conditions is not met in Scenario A, the entire message typed by the local user is displayed within the single conversation bubble 208(1).

By contrast, in Scenario B, the local user may type the same message as described in Scenario A, the difference being that the remote user in Scenario B types the word "Hey" after the local user started typing the first portion of text content (e.g., "Hey Henry." in FIG. 2) and before the local user started typing the second portion of text content (e.g., "Wanna go to lunch?" in FIG. 2). Thus, after the local user selects the selectable element 214 to invoke the control function in Scenario B of FIG. 2, and in response to the local user typing the text character "W" of the word "Wanna", the first UE 202 determines a presence on the display of the conversation bubble 208(3) designated for the second UE (or the remote user thereof), and, in response to determining the presence of this remote user conversation bubble 208(3), creates the second conversation bubble 208(4), and displays the text character "W" within the second conversation bubble 208(4). As the local user in Scenario B continues to type the remainder of the RTT message, the second portion of text content is displayed within the second conversation bubble 208(4) designated for the first UE 202 (or the local user thereof). The additional control mechanism of FIG. 2 (e.g., determining a presence on the display of a remote user conversation bubble) in combination with the user-selectable control function 114 offers a finer-tuned control mechanism for breaking up RTT content amongst separate conversation bubbles 208, which may have added technical effects, such as better use of the display space by keeping a user's RT content within a single conversation bubble 208 until a conversational sequence is to be visually conveyed on the screen. That is, in Scenario A of FIG. 2, display space can be conserved by consolidating the local user's text content within the single conversation bubble 208(1) seeing as how there is no need to visually convey relative timing of text content entered by multiple users (i.e., only one user is typing in Scenario A). When the remote user starts typing (as is the case in Scenario B), a need to convey timing of the relative portions of the conversation arises, and the local user's text content may be broken up to convey this back-and-forth timing of the written conversation in a visual sense.

Figure 3:
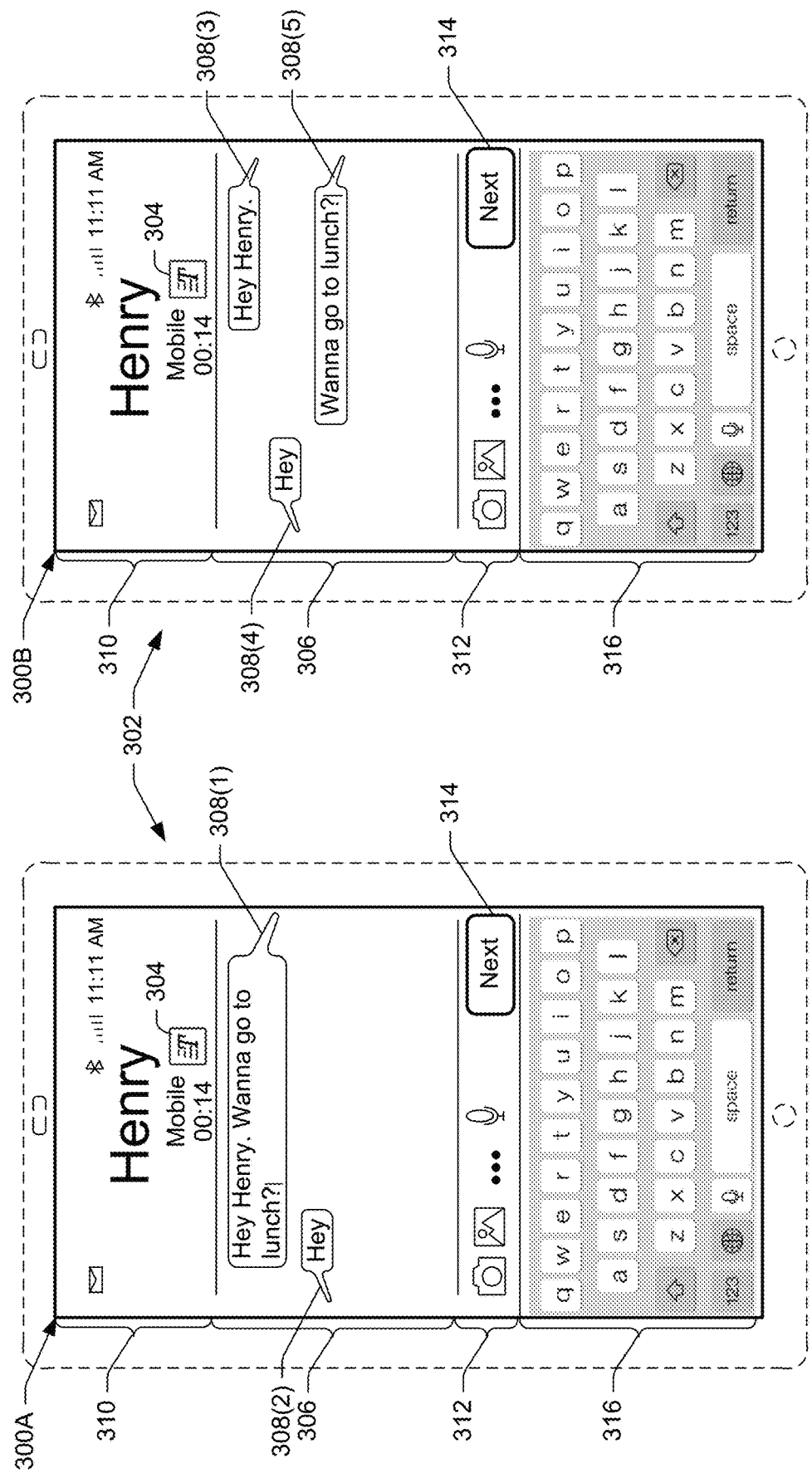
FIG. 3 illustrates example user interfaces that may be presented on a display of a UE during a RTT communication session in two different scenarios, according to yet another embodiment. Scenario A of FIG. 3 illustrates a case where a timer has not expired before a local user inputs a second portion of text. Scenario B illustrates a case where the timer has expired when the local user inputs a second portion of text, causing the second portion of the local user's text to be displayed in a separate conversation bubble.

FIG. 3 illustrates example user interfaces 300A and 300B that may be presented on a display of a UE 302 during a RTT communication session in two different scenarios, according to yet another embodiment. FIG. 3 illustrates a time-based control mechanism that can be utilized independently, and/or in combination with any of the other control mechanisms described herein (such as the selectable control function element 314). In FIG. 3, the first UE 302 may be configured to initiate a timer in response to the occurrence of particular events, and monitor the expiration of the timer relative to the occurrence of other events. For example, as shown in Scenario A, during a RTT communication session where a RTT message (one or more text characters) typed by a local user of the first UE 302 is displayed in a first conversation bubble 308(1), the first UE 302 may initiate a timer whenever the first UE 302 subsequently receives a RTT packet carrying one or more text character(s) typed by a remote user of the second UE. The timer may be set to run for any suitable period of time (e.g., 1 second, 2 seconds, 3 seconds, etc.). The first UE 302 may monitor the expiration of this timer (time period) against the detection of any subsequent user input from the local user requesting to type one or more new text characters, and if such user input is detected before the expiration of the timer, the one or more new text characters are displayed in the same, first conversation bubble 308(1) along with the previously-typed text characters. Otherwise, if the timer expires prior to any new text input by the local user, then the new text character(s) may be displayed in a new conversation bubble.

Thus, in Scenario A of FIG. 3, the first UE 302 detected user input from the local user to type the phrase "Hey Henry.", and the first UE 302 displayed those text characters in the first conversation bubble 308(1). Subsequently, at time, t, the first UE 302 received a RTT packet with the text character "H" of the word "Hey" typed by the remote user of the second UE. The first UE 302 may be configured to initiate a timer at time, t, when the first UE 302 receives the RTT packet carrying text character "H", typed by the remote user, and the timer may be set to run for a prescribed period of time (e.g., N seconds). As the remote user types out the word "Hey", this word is displayed in the second conversation bubble 308(2) designated for the second UE (or the remote user thereof). In Scenario A, the local user provides, before the expiration of the timer (e.g., at t+M seconds, where M<N; N being the value of the time period), additional user input to type the text character "W" of the word "Wanna" in the second portion of text content. Because the additional user input was detected prior to expiration of the timer, the first UE 302 displays the second portion of the text content (e.g., "Wanna go to lunch?") in the same conversation bubble 308(1) that contains the first portion of the text content (e.g., "Hey Henry.").

By contrast, in Scenario B of FIG. 3, the first UE 302 detected user input from the local user to type the phrase "Hey Henry.", and the first UE 302 displayed those text characters in the first conversation bubble 308(3). Subsequently, at time, t, the first UE 302 received a RT packet with the text character "H" of the word "Hey" typed by the remote user of the second UE. The first UE 302 may be configured to initiate a timer at time, t, when the first UE 302 receives the RTT packet carrying text character "H", typed by the remote user, and the timer may be set to run for a prescribed period of time (e.g., N seconds). As the remote user types out the word "Hey", this word is displayed in the second conversation bubble 308(4) designated for the second UE (or the remote user thereof). In Scenario B, however, the local user provides, after the expiration of the timer (e.g., at t+P seconds, where P>N; N being the value of the time period), additional user input to type the text character "W" of the word "Wanna" in the second portion of text content. Because the additional user input was detected after expiration of the timer, the first UE 302 displays the second portion of the text content (e.g., "Wanna go to lunch?") in a new conversation bubble 308(5) that is different from the first conversation bubble 308(3) that contains the first portion of the text content (e.g., "Hey Henry."), and this new conversation bubble 308(5) may be displayed below the remote user conversation bubble 308(4).

In this manner, FIG. 3 illustrates yet another control mechanism (e.g., a time-based control mechanism) that can be utilized independently, or in combination with the other control mechanisms described herein to further refine the control aspects of partitioning RTT content amongst separate conversation bubbles 308. It is to be appreciated that the trigger event to initiate the timer of FIG. 3 may vary. For example, the timer may start whenever the local user provides user input requesting to type a text character(s) (e.g., the text character "H" of the word "Hey" displayed in the first conversation bubble 308(3)). Alternatively, the timer may start when the local user stops typing text characters for a period of time (e.g., no user input for a period of P seconds, then start timer).

FIG. 4 illustrates example user interfaces 400A and 400B that may be presented on a display of a UE 402 during a RTT communication session in two different scenarios, according to yet another embodiment. FIG. 4 illustrates a conversation bubble "out of screen" control mechanism that can be utilized independently, and/or in combination with any of the other control mechanisms described herein (such as the selectable control function element 414). The "out of screen" control mechanism operates by creating a new remote user conversation bubble 408 for new text content typed by the remote user of the second UE whenever a previous/existing remote user conversation bubble 408 gets "pushed out of screen" (i.e., when the previous/existing remote user conversation bubble 408 moves from a location within the defined boundary of the RT conversation area 406 to a location outside of the defined boundary of the RTT conversation area 406.

For example, as shown in Scenario A of FIG. 4, during a RTT communication session, the first UE 402 may receive a RT packet carrying one or more text characters typed by the remote user. In the example of FIG. 4, a packet carrying at least the text character "M" of the word "My" may be received by the first UE 402 over the telecommunications network. In response to receiving this RTI packet carrying the text character "M", the first UE 402 may display the first conversation bubble 408(1) designated for the second UE (or the remote user thereof) with at least the text character "M" within the first conversation bubble 408(1). As additional packets carrying text characters typed by the remote user are received from the second UE over the telecommunications network, those text characters are displayed in the first conversation bubble 408(1) as well, as shown in Scenario A of FIG. 4.

Consider a scenario where the remote user is in the middle of typing the message "My address is 4324 Glendale Drive" when the local user of the first UE 402 provides user input to the first UE 402 requesting to type the text characters that are displayed in the second conversation bubble 408(2) designated for the first UE 402 (or the local user thereof). For example, the remote user may have only finished typing "My address is" when the local user started typing the message shown in the second conversation bubble 408(2) designated for the first UE 402 (or the local user thereof). In Scenario A of FIG. 4, the local user may have finished typing "Restaurant C", and then the remote user may have finished typing the remainder of the message "4324 Glendale Drive." In Scenario A, the first conversation bubble 408(1) designated for the second UE (or the remote user thereof) is still within the defined boundary of the RTT conversation area 406 (or an area on the display where conversation bubbles 408 are presented). Because the first conversation bubble 408(1) designed for the second UE (or the remote user thereof) is still within the defined boundary of the RTT conversation area 406 when the first UE 402 receives the RTT packets carrying the text characters "4324 Glendale Drive", these text characters are displayed within the first conversation bubble 408(1) designated for the second UE (or the remote user thereof), which also includes the first text characters "My address is."

By contrast, in Scenario B of FIG. 4, consider a similar situation where the remote user types a first portion of a RTT message (e.g., "My address is"), which causes these text characters to be displayed in the first conversation bubble 408(3). Before the remote user is able to finish typing the remainder of the RTT message, however, the local user of the first UE 402 types the relatively lengthy message shown in the second conversation bubble 408(4). Due to the size of the second conversation bubble 408(4) designated for the first UE 402 (or the local user thereof), however, the first conversation bubble 408(3) designated for the second UE (or the remote user thereof) moves outside of the designated boundary of the RTT conversation area 406 in order to make room for displaying the text characters of the relatively lengthy RTT message typed by the local user, and displayed in the second conversation bubble 408(4). In Scenario B of FIG. 4, the first UE 402 may be configured to detect this out of screen condition of the first conversation bubble 408(3) by determining that the first conversation bubble 408(3) designated for the second UE (or the remote user thereof) has moved outside of the designated boundary that defines the RTT conversation area 406 where conversation bubbles 408 are to be presented. In response to detecting this out of screen condition of the first conversation bubble 408(3) at a time when the first UE 402 receives the RTT packets carrying the text characters "4324 Glendale Drive" typed by the remote user, these text characters are displayed within a new, third conversation bubble 408(5) designated for the second UE (or the remote user thereof), which is different from the first conversation bubble 408(3) that has since moved outside of the RT conversation area 406. In some embodiments, in response to detecting this out of screen condition of the first remote user conversation bubble 408(3) when RT packets carrying new text characters typed by the remote user are received, the text content formerly displayed within the first remote user conversation bubble 408(3) may be moved to (copied and pasted to) the new, third conversation bubble 408(5) designated for the second UE (or the remote user thereof). This alternative implementation would move the text content "My address is" to the third conversation bubble 408(5), and place the text content before the later-typed text content (e.g., "4324 Glendale Drive").

Figure 5:
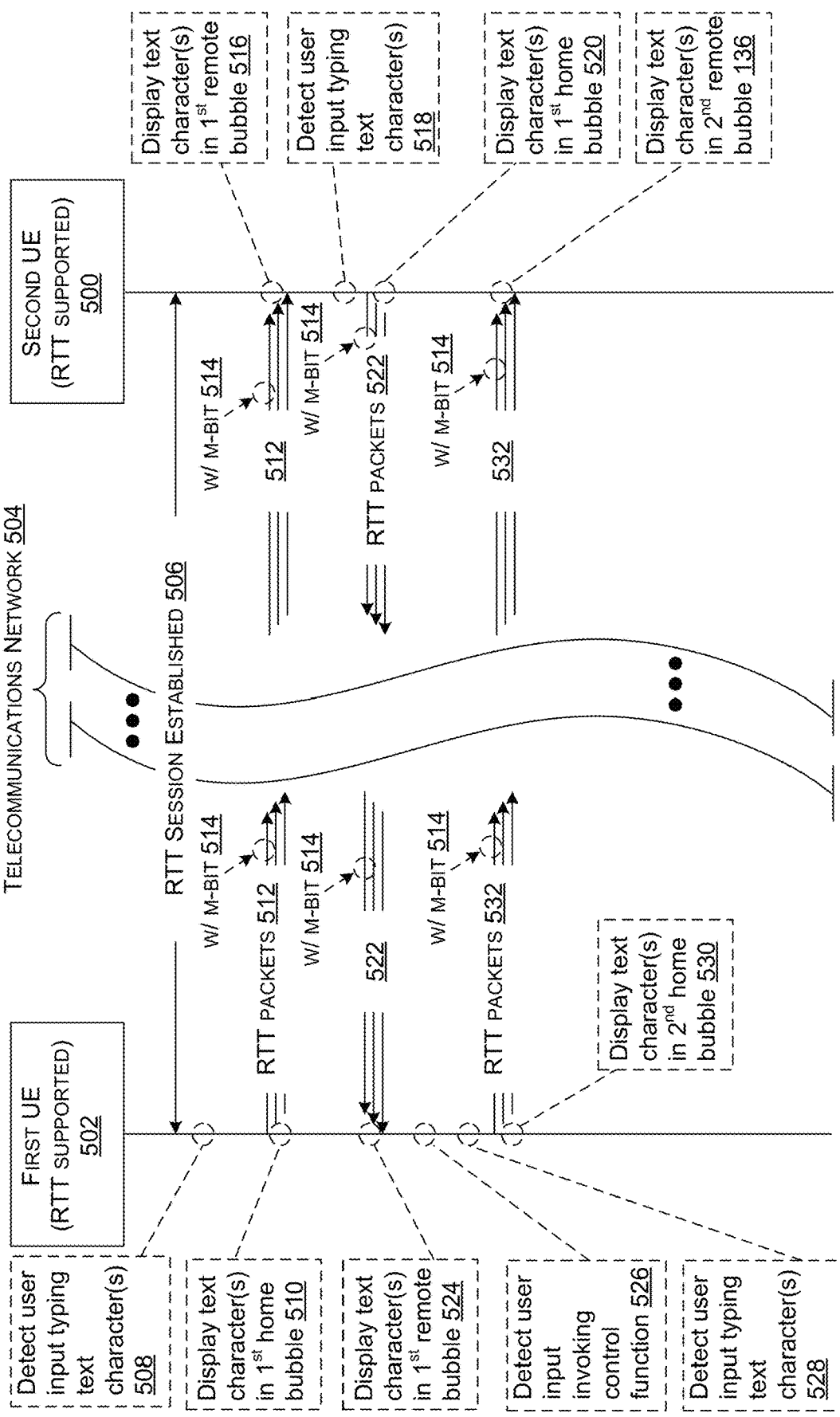
FIG. 5 is a diagram illustrating a first UE and a second UE exchanging RTT content during a RTT communication session, FIG. 5 illustrating how each UE notifies the other in order to control how RTT content is partitioned among conversation bubbles on each UE's display.

FIG. 5 is a diagram illustrating a first UE 502 and a second UE 500 exchanging RT content over a telecommunications network 504 during a RT communication session. The telecommunications network 504 may represent a network comprising a plurality of network nodes disposed between the first UE 502 and the second UE 500. It is to be appreciated that the telecommunications network 504 can include any suitable types, and number, of network nodes to enable the transmission of IP multimedia over the telecommunications network 504. For example, the telecommunications network 504 may include, without limitation, various radio access networks (RANs) (e.g., eNodeB, cell towers, wireless access points, etc.), an evolved packet core (EPC), as well as a multimedia telephony (MMTel) and IMS architecture (sometimes referred to as the "IMS core network," the "IMS network," the "Core Network (CN)," or the "IM CN Subsystem"). The IMS is an architectural framework defined by the $3^{rd}$ Generation Partnership Project (3GPP) for delivering IP multimedia to UEs, such as the first UE 502 and the second UE 500. In the example of FIG. 5, the first UE 502 represents an originating UE that is RT-capable, and which is used to access a RT-based service provided by a wireless carrier who maintains and/or operates at least a portion of the telecommunications network 504. When the RT communication session is successfully established at 506, the first UE 502 and the second UE 500 may begin exchanging RTT content via a RTT media stream (which may be provided as an add on stream to a voice media stream for voice content/data).

As shown in FIG. 5, the first UE 502 may detect, via an input device (e.g., a touchscreen) of the first UE 502, first user input at 508. The first user input detected at 508 may include user input requesting to type one or more first text characters of a RT message. In response to detecting this user input at 508, the first UE 502 may display, at 510, the first text character(s) in a first conversation bubble 108/208/308/408 designated for the first UE 502 (or the local user thereof). FIG. 5 refers to this conversation bubble 108/208/308/408 as a "home" bubble to indicate that it is designated for the "home" user (or the local user) of the first UE 502.

FIG. 5 also shows that the first UE 502 is configured to send, via a network interface of the first UE 502, and over the telecommunications network 504 to a second UE 500, RTT packets 512, individual ones of the RIT packets 512 carrying the first text character(s) typed by the local user at 508. During a RTT communication session, multiple RIT packets, such as the RIT packets 512, may be transmitted, without user intervention, at a predetermined frequency to enable real-time transmission of text content between the UEs 502/500. RTT packets, such as the RTT packets 512, may be sent using Real-time Transport Protocol (RTP) and user datagram protocol (UDP) to carry content (e.g., text content and/or non-text content) of a RTT media stream. The RTT packets can be transmitted at any suitable frequency (e.g., time sampled) to resemble real-time transmission. For example, the first UE 502 may send RTT packets, such as the RTT packets 512, at a particular frequency (e.g., every second) in order to resemble a real-time conversation and near instantaneous display of the text content on the second UE 500, as the local user types text characters at the first UE 502. As used herein, "real-time" or "substantially real-time" means that a time period measured from the moment RTT content is input on a source device (e.g., the first UE 502) to a moment the same content is displayed on a target/receiving device (e.g., the second UE 500) is sufficiently short to experience, at the target/receiving device, a display of the content as a user is entering the content at the source device. This period of time may be on the order of a few seconds, and it is recognized that there will be some amount of time delay between inputting content on the source device and displaying the content on the target/receiving device.

In some embodiments, the RTT media stream is assigned a QoS Class Identifier (QCI) value that is suitable for real time transmission, such as a QCI value of 1, as defined in LTE. This QCI value may correspond to the QoS that is the same QoS given to voice data during a communication session. QCI is a scalar denoting a set of transport characteristics (e.g., bearer with/without guaranteed bit rate (GBR), priority, packet delay budget, packet error loss rate, etc.) and is used to infer specific parameters related to packet forwarding (e.g., scheduling weights, admission thresholds, queue management thresholds, link-layer protocol configuration, etc.).

The Internet Engineering Task Force (IETF) Request for Comments (RFC) 4103 sets forth a technical specification for carrying text content of an RTT message in RTP packets. The Alliance for Telecommunication Industry Solutions (ATIS) 0700029 sets forth an additional technical specification for certain aspects of the mobile device behavior for handling RTT to facilitate communication between mobile devices (including emergency services) across multiple Commercial Mobile Service Providers (CMSPs). Unless otherwise specified, RTT content carried in RTT packets, such as the RTT packets 512, can be transmitted as part of a RTT media stream using the same or similar details (e.g., techniques, parameters, etc.) specified in the IETF RFC 4103 and/or ATIS 0700029 specifications.

As shown in FIG. 5, the first UE 502 is also configured to send a first RTT packet that carries the first text character typed at 508 along with a maker bit (m-bit) 514, whereas subsequent RTT packets of the RTT packets 512 carrying the remaining text characters of a message that is to displayed in the same conversation bubble 108/208/308/408 as the first text character do not include the m-bit 514. The m-bit 514 sent with the first RTT packet of the RTT packets 512 may be similar to the m-bit defined in RFC 4103, which is used for redundancy purposes in RFC 4103. Accordingly, the m-bit 514 may be included in the first RTT packet of the RTT packets 512 by setting the marker bit in the RTP data header to 1. Subsequent RTT packets of the RT packets 512 carrying the remaining text characters of the same conversation bubble 108/208/308/408 may not include the m-bit 514 by setting the market bit in the RTP data header of those packets to 0.

The inclusion of the m-bit 514 in the first RTT packet of the RTT packets 144 may serve as a notification to the second UE 500 to create a new conversation bubble 108/208/308/408 designated for the first UE 502 (or the local user thereof) on the display of the second UE 500. This is why the m-bit 514 may be included in the very first RTT packet 512 carrying the very first text character of the message typed at 508 by the local user at the first UE 502. Accordingly, at 516, the second UE 500 may receive the first RTT packet of the RTT packets 512 along with the m-bit 514, and may respond by displaying the first text character(s) in a first conversation bubble 108/208/308/408 designated for the first UE 502 (or the local user thereof). FIG. 5 refers to this conversation bubble 108/208/308/408 as a "remote" bubble because, from the perspective of the second UE 500, the user of the first UE 502 is a remote user. Thus, on the display of the second UE 500, text content typed by the local user of the first UE 502 will appear in conversation bubbles 108/208/308/408 designated for a remote user relative to the second UE 500 (e.g., left-aligned conversation bubbles 108/208/308/408).

At 518, the second UE 500 may detect, via an input device of the second UE 500, user input provided by the user of the second UE 500 requesting to type one or more text characters. At 520, in response to detecting the user input at 518, the second UE 500 may display the text character(s) typed by the remote user of the second UE 500 in a conversation bubble 108/208/308/408 designated for the second UE 500 (or the remote user thereof), which is a different bubble than the initial conversation bubble 108/208/308/408 designated for the first UE 502 (or the local user thereof).

In addition, the second UE 500 may send, via a network interface of the second UE 500, and over the telecommunications network 504 to the first UE 502, RT packets 522, individual ones of the RTT packets 522 carrying the text character(s) typed by the remote user of the second UE 500 at 518. Again, multiple RTT packets, such as the RTT packets 522, may be transmitted, without user intervention, at a predetermined frequency to enable real-time transmission of text content between the UEs 502/500. The second UE 500 is also configured to send a very first RTT packet of the RTT packets 522, which carries the first text character typed at 518, along with a m-bit 514.

The first UE 502 may receive the RTT packets 522, including a first-received RTT packet of the RTT packets 522 that includes the m-bit 514, which indicates to the first UE 502 that the text characters carried by the RTT packets 522 including, and following, the first-received RTT packet, are to be displayed in a new conversation bubble 108/208/308/408 designated for the second UE 500 (or the remote user thereof). Thus, at 524, the first UE 502 may display the text character(s) typed by the remote user of the second UE 502 at 518 within a conversation bubble 108/208/308/408 designated for the second UE 502 (or the remote user thereof) on a display of the first UE 502.

The local user of the first UE 502 may then invoke a control function 114/214/314/414 (e.g., by selecting a selectable element 114/214/314/414 to invoke the control function). At 526, the first UE 502 detects this user input invoking the control function 114/214/314'414. In the example of FIG. 5, the first UE 502 may register the invocation of the control function 114/214/314/414 without doing anything else. In other embodiments, the first UE 502 may responds to this invocation of the control function 114/214/314/414 by sending an immediate notification to the second UE 500. In FIG. 5, however, the first UE 502 may register the invocation of the control function 114/214/314/414 and wait for additional user input requesting to type additional text characters.

Accordingly, at 528, the first UE 502 may detect, via the input device (e.g., a touchscreen) of the first UE 502, second user input. The second user input detected at 528 may include user input requesting to type one or more second text characters of a RTT message. In response to detecting this second user input at 528, and because the second user input detected at 528 was detected after detecting the user input at 526 requesting invocation of the control function 114/214/314/414, the first UE 502 may display, at 530, the second text character(s) in a second conversation bubble 108/208/308/408 designated for the first UE 502 (or the local user thereof), which is different from the first conversation bubble containing the first text character(s) displayed at 510.

Furthermore, because the local user invoked the control function 114/214/314/414 prior to typing the second text character(s), the first UE 502 may send a very first RTT packet of multiple RTT packets 532 along with a m-bit 514 to notify the second UE 500 that the control function 114/214/314/414 was invoked at the first UE 502, and that the second UE 500 is to display the second text character(s) carried by the RTT packets 532 within a new conversation bubble 108/208/308/408 designated for the first UE 502 (or the local user thereof) on the display of the second UE 500. Accordingly, the second UE 500, upon receiving the first RTT packet of the RTT packets 532 with the m-bit 514, may display the second text character(s) carried by that first-received RTT packet, and by the following RTT packets 532, within a new conversation bubble 108/208/308/408 designated for the first UE 502 (or the local user thereof) on the display of the second UE 500. Thus, FIG. 5 illustrates how each UE notifies the other in order to control how RIT content is partitioned among conversation bubbles 108/208/308/408 on each UE's display. Notably, FIG. 5 illustrates the inclusion of a m-bit 514 with any first-transmitted RIT packet that carries a first text character of text content that is to be displayed in a new conversation bubble 108/208/308/408, and the invocation of the control function 114/214/314/414 can cause the transmitting UE to include the m-bit 514 in a following RIT packet carrying one or more text characters for this purpose.

Figure 6:
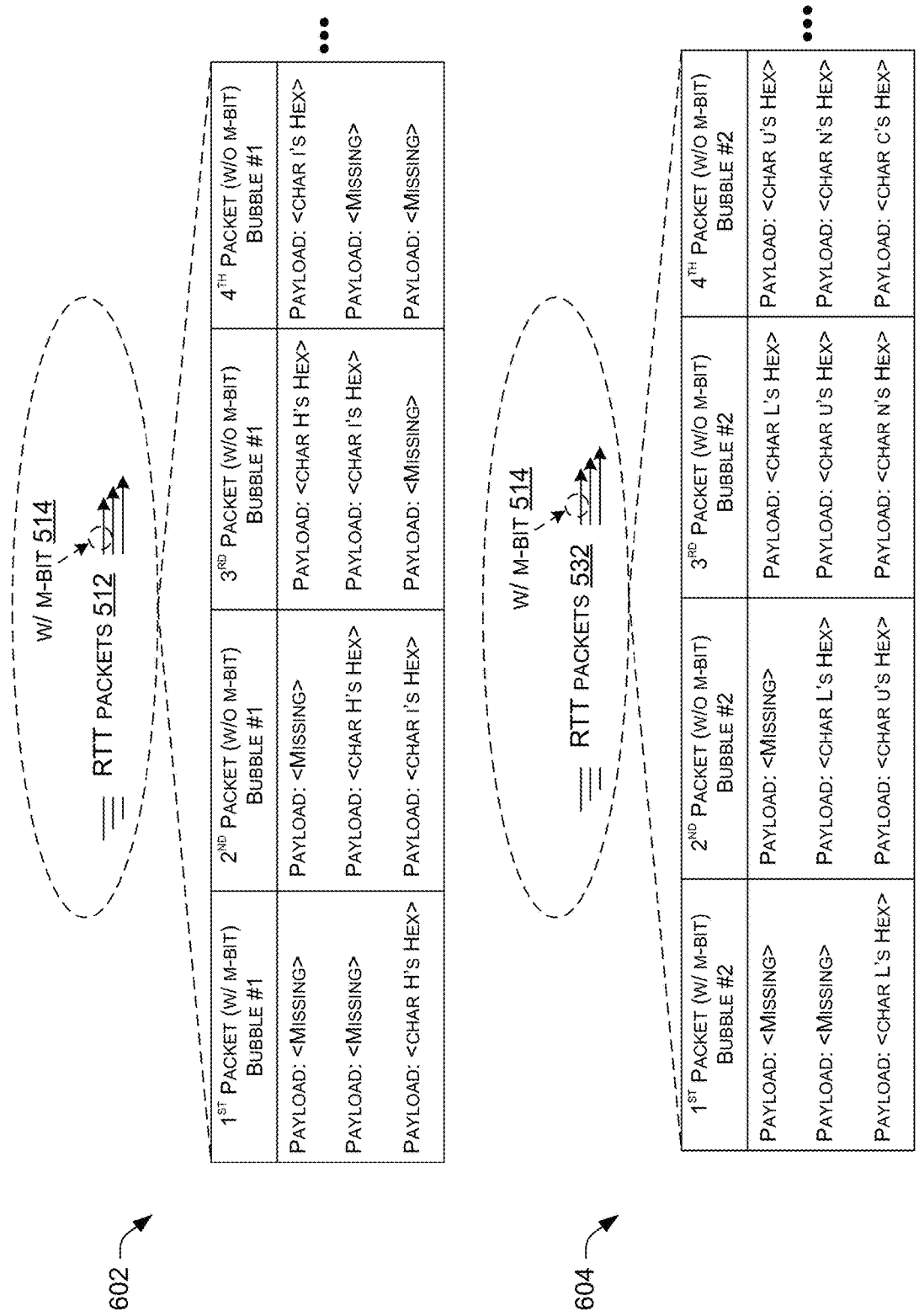
FIG. 6 is a diagram illustrating RTT packets, some of which include a marker bit (m-bit) for notifying another UE over a telecommunications network how to partition RTT content among conversation bubble's on the other UE's display.

FIG. 6 is a diagram illustrating RIT packets, such as the RIT packets described with reference to FIG. 5, some of which include an m-bit for notifying another UE over a telecommunications network 504 how to partition RIT content among conversation bubble's 108/208/308/408 on the other UE's display.

As shown at 602, the RIT packets 512 sent by the first UE 502 to the second UE 500 in FIG. 5 are shown in further detail, with a first packet including a m-bit 514, and carrying at least one text character (e.g., the text character "H" of the word "Hi"). FIG. 6 illustrates an example where RIT packets are sent with 3-layer redundancy to account for possible packet loss, meaning that a single text character typed by a user may be send in three sequential RIT packets. At 602, the text character "H" of the word "Hi" is carried in the first RIT packet, the second RIT packet, and the $3^{rd}$ RIT packet. This may be done for the text character "i", as well. However, because the entire word "Hi" is to be included in a single conversation bubble 108/208/308/408 (e.g., Bubble #1) on the second UE 500, the first RIT packet in 602 is sent along with the m-bit 514, which instructs (or notifies) the second UE 500 to create a new conversation bubble 108/208/308/408 and to display the text character (e.g., "H") carried by the first RIT packet within the new conversation bubble 108/208/308/408 (e.g., Bubble #1). Because the RIT packets that follow the first RIT packet do not include the m-bit 514, the second UE 500 that receives the RT packets 512 displays both text characters "H" and "i" within the same conversation bubble 108/208/308/408 (e.g., Bubble #1) to display the word "Hi" within Bubble #1. The ellipsis shown at 602 indicate that the RIT packets 512 can include more RIT packets than the four RTT packets shown at 602. It is to be appreciated that the RTT packets 512 can include less RT packets than the four RTT packets shown at 602, such as when a single text character is transmitted in RT packets 512.

As shown at 604, at some point in time after the transmission of the RTT packets 512 shown in 602, the first UE 502 may send additional RT packets 532 carrying additional text characters. Referring briefly again to FIG. 5, recall that the user invoked the control function 114/214/314/414 prior to the transmission of the RTT packets 532, and because of the invocation of the control function 114/214/314/414, the first RTT packet of the subsequently-transmitted RT packets 532 may be sent along with a m-bit 514, which instructs (or notifies) the second UE 500 to create a new conversation bubble 108/208/308/408 and to display the text character (e.g., "L") carried by the first RT packet within the new conversation bubble 108/208/308/408 (e.g., Bubble #2). Thus, the m-bit 514 is usable to instruct (or notify) the receiving UE (e.g., the second UE 500) when it is time to create a new conversation bubble 108/208/308/408 designated for the sending UE (e.g., the first UE 502). At 604, the local user of the first UE 502 may be typing the word "Lunch", which is transmitted, character-by-character in the RT packets 532 in real-time. The ellipsis shown at 604 indicate that the RT packets 532 can include more RT packets than the four RTT packets shown at 604. It is to be appreciated that the RT packets 532 can include less RTT packets than the four RTT packets shown at 604, such as when a single text character is transmitted in RT packets 532.

Figure 7:
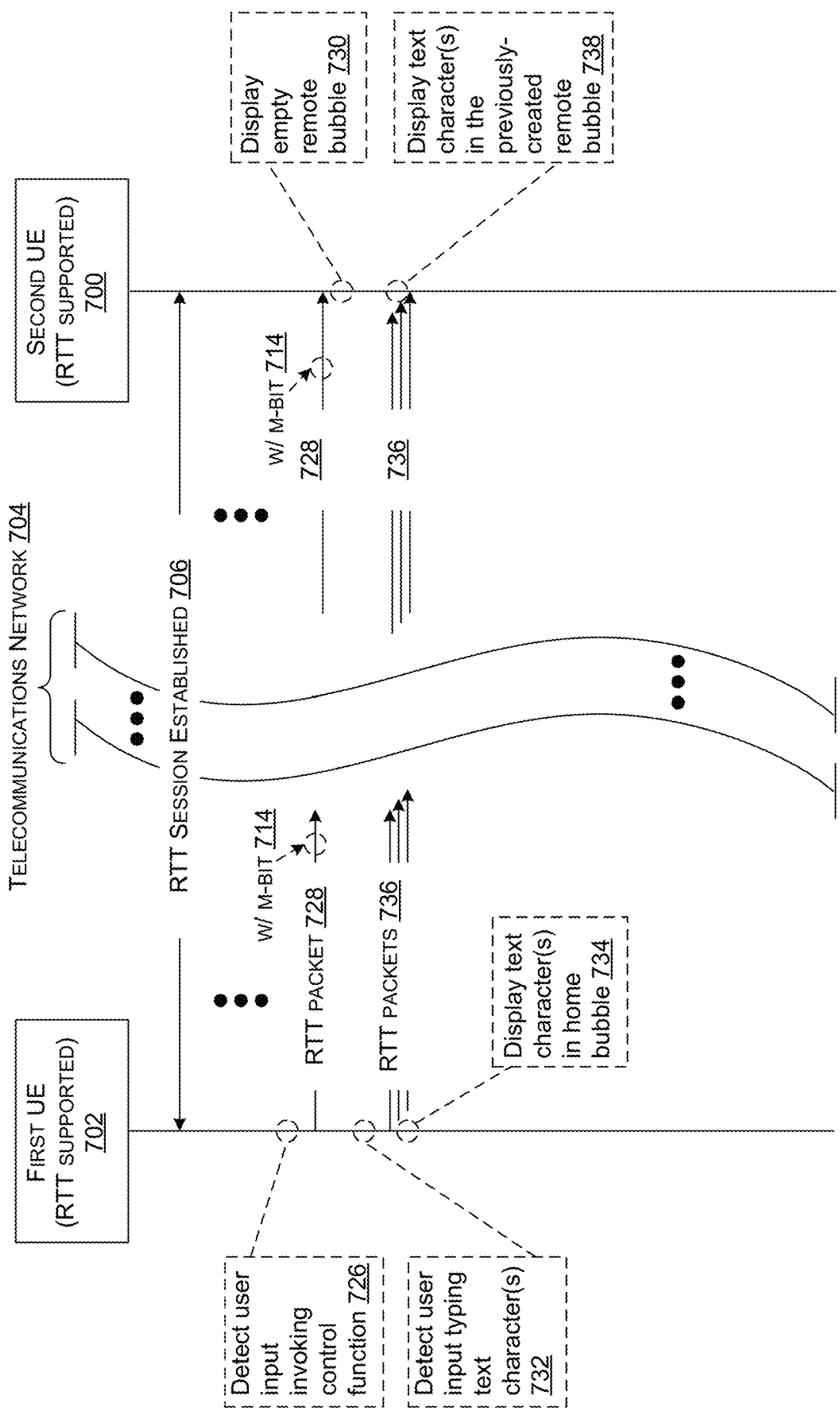
FIG. 7 is a diagram illustrating a first UE and a second UE exchanging RT content during a RTT communication session, FIG. 7 illustrating another example of how each UE notifies the other in order to control how RTT content is partitioned among conversation bubbles on each UE's display.

FIG. 7 is a diagram illustrating a first UE 702 and a second UE 700 exchanging RT content over a telecommunications network 704 during a RTT communication session, FIG. 7 illustrating another example of how each UE notifies the other in order to control how RT content is partitioned among conversation bubbles on each UE's display. For example, in FIG. 7, after the local user of the first UE 702 invokes the control function 114/214/314/414, which is detected at 726 by the first UE 702, the first UE 702 may be configured to send an immediate (within a few milliseconds) notification to the second UE 700 indicating that the control function 114/214/314/414 has been invoked at the first UE 702. In FIG. 7, the notification is sent in the form of a RTT packet 728 that includes a m-bit 714 to notify the second UE 700 that any subsequent text characters received in RT packets from the first UE 702 are to be displayed at the second UE 700 in a new conversation bubble 108/208/308/408 designated for the first UE 702 (or the local user thereof). It is to be appreciated that the RTT packet 728 may include one or more control characters that are not to be displayed on the second UE 700. The control characters included in the RTT packet 728 may comprise the control characters "GA", "CR", "LF", or any similar control characters that are discarded (e.g., not displayed) by the second UE 700 upon receipt of the RTT packet 728. In some embodiments, a RTT packet 728 including a control character(s) without a m-bit may instruct the receiving/destination device (e.g., the second UE 700) to break to a next line within an existing conversation bubble 108 rather than creating a new conversation bubble 108. The user interfaces described herein my provide an additional selectable element to allow a user typing text content to select such a "line break" control function to have content moved to a next line, rather than to create an entirely new conversation bubble 108. The RTT packet 728 could alternatively be a "silent" packet that carries no control characters or displayable text characters, but includes the m-bit 714. As yet another alternative, instead of including the m-bit 714, the RTT packet 728 may carry a control character without any displayable text characters to notify the second UE 700 that the control function 114/214/314/414 was invoked at the first UE 702.

Upon receipt of the RTT packet 728, the second UE 700 may, at 730, display an empty conversation bubble 108/208/308/408 designated for the first UE 702 (or the local user thereof) because the RT packet 728 may not carry any displayable text characters, as described above. Thus, the second UE 700 may display the conversation bubble 108/

208/308/408 designated for the first UE 702 (or the local user thereof) without any text characters, and may wait for a following RTT packet that includes one or more text characters typed by the local user of the first UE 702 before displaying those text characters.

At 732, the first UE 702 may detect user input requesting to type one or more text characters, and the first UE 702 may, at 734, display the text character(s) within a conversation bubble 108/208/308/408 designated for the first UE 702 (or the local user thereof) on a display of the first UE 702. The first UE 702 may also send multiple RI packets 736 at a predetermined frequency, individual ones of the RT packets 736 carrying the text character(s) typed by the local user at the first UE 702.

The second UE 700 may receive the RTT packets 736 carrying the text character(s) typed by the local user at the first UE 702, and may, at 738, display the text character(s) typed by the local user at the first UE 702 within the conversation bubble 108/208/308/408 that was previously-created and displayed at 730. Thus, FIG. 7 illustrates an example of notifying the second UE to create a new conversation bubble 108/208/308/408 designated for the first UE 702 (or the local user thereof) by transmitting a RTT packet 728, as described with reference to FIG. 7.

Figure 8:
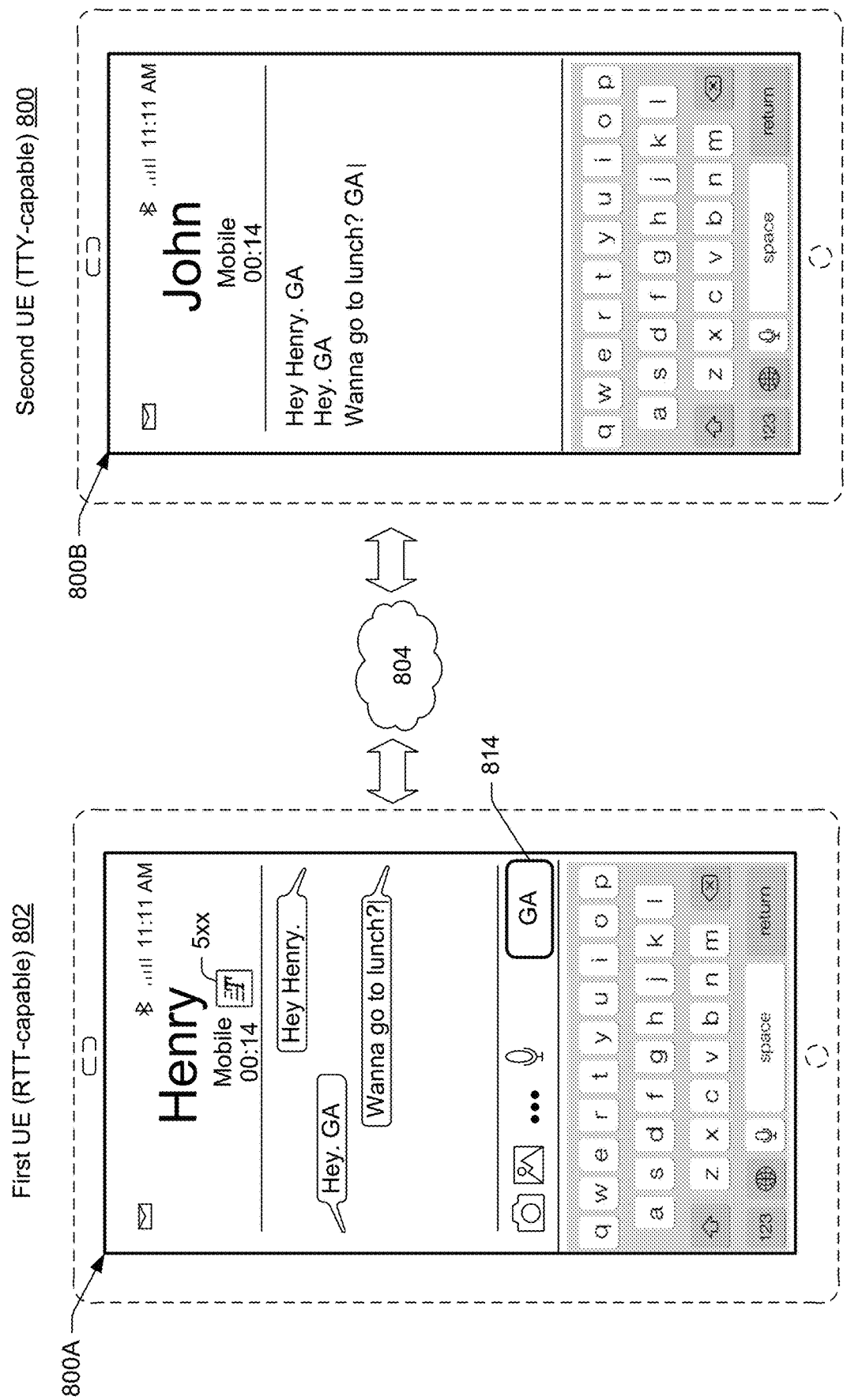
FIG. 8 illustrates example user interfaces that may be presented on respective displays of a RTT-capable originating UE and a Teletypewriter (TTY)-capable terminating UE during a communication session, where the RT-capable originating UE is configured to send displayable control characters to the TTY-capable terminating UE when a user of the originating UE invokes a control function.

FIG. 8 illustrates example user interfaces 800A and 800B that may be presented on respective displays of a RTT-capable originating UE 802 and a Teletypewriter (TTY)-capable terminating UE 800 during a communication session, where the RTT-capable originating UE 802 is configured to send displayable control characters to the TTY-capable terminating UE 800 when a user of the originating UE 802 invokes a control function 814.

In FIG. 8, the telecommunications network 804 may be configured to transcode RTT messages sent by the first UE 802 into TTY-coded messages that are receivable by the second UE 800. In this way, the TTY-capable UE 800 is able to communicate with a RTT-capable UE 802 using real-time text exchange without reconfiguring the UEs 802/800 because the telecommunications network 804 takes care of the transcoding. In this situation, because the TTY-capable UE 800 may not be able to handle the RTT characteristics (e.g., m-bits) of the messages transmitted by the RTT-capable UE 802, it may be useful to display particular text characters on the second UE 800 whenever the local user of the first UE 802 selects the control function 814. In FIG. 8, the example selectable control function element 814 is shown as a soft button with the control characters "GA", meaning Go Ahead, which is a commonplace abbreviation in TTY to indicate that the sender is ready for the other person's response.

Thus, during a setup of the communication session involving the first and second UEs 802/800, the first UE 802 may determine that the second UE 800 is not RTT-capable, but is TTY-capable. The first UE 802 may make this determination based at least in part on an omission of a feature tag from a Session Initiation Protocol (SIP) response received by the first UE 802 during a session setup of the communication session. The feature tag omitted from the SIP response may be used to indicate that a UE supports the exchange of content via RTT messages, which means that the second, TTY-capable UE 800 would not include this feature tag in a SIP response during setup of the communication session, seeing as how the second UE 800 does not have this capability.

Accordingly, when the user invokes the control function 814 after typing the message "Hey Henry", the first UE 802 may be configured to send, over the telecommunications network 804 to the second UE 800, a RT packet carrying one or more displayable text characters (e.g., the displayable text characters "GA"). When the second UE 800 receives transcoded TTY messages with the text characters for the control characters "GA" following the receipt of TTY messages for the message "Hey Henry," the second UE displays the text characters "GA" following the message "Hey Henry," which indicates, to the remote user of the second UE 800, that the control function 814 has been invoked at the first UE 802.

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 9:
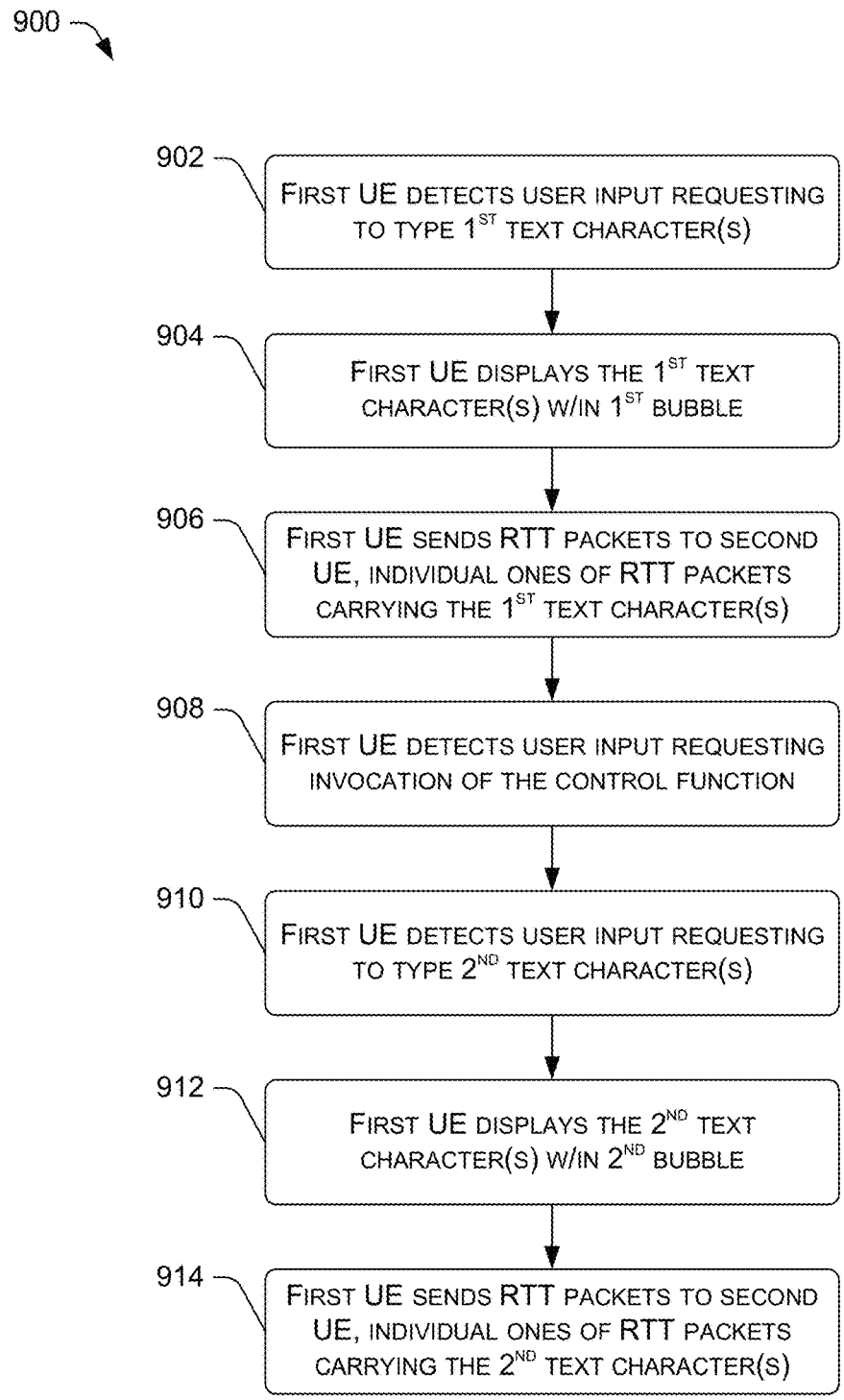
FIG. 9 illustrates a flowchart of an example process for partitioning RT content, and displaying, at a source device, the partitioned RTT content within separate conversation bubbles based at least in part on a user invocation of a control function at the source device.

FIG. 9 illustrates a flowchart of an example process 900 for partitioning RIT content, and displaying, at a source device, the partitioned RTT content within separate conversation bubbles 108/208/308/408 based at least in part on a user invocation of a control function 114/214/314/414 at the source device. The process 900 may be implemented by any of the RTT-capable UEs described herein acting as a source device that is sending RTT content to a destination device. For illustrative purposes, the process 900 will be described with reference to the elements shown in FIG. 1, but it is to be appreciated that elements of FIG. 1 that are referenced in the process 900 may be replaced with any of the other elements with like reference numerals, or that are described similarly in other figures. For example, the first UE 102 referenced in FIG. 9 may be replaced with other first UEs 202/302/402/502/702/802 described herein. The process 900 is described, by way of example, with reference to the previous figures.

At 902, during a RTT communication session between a first UE 102 and a second UE (e.g., the second UE 500/700/800), the first UE 102 may detect, via an input device of the first UE 102, first user input requesting to type one or more first text characters.

At 904, the first UE 102 may display, on a display of the first UE 102, the one or more first text characters within a first conversation bubble 108(2) designated for the first UE 102.

At 906, the first UE 102 may send, via a network interface of the first UE 102, and over a telecommunications network to the second UE involved in the RTT communication session, at least one first RTT packet of multiple RTT packets (e.g., the RTT packets 512) that are transmitted, without user intervention, at a predetermined frequency, the at least one first RIT packet carrying the one or more first text characters.

At 908, the first UE 102 may detect, after sending the at least one first RTT packet to the second UE and via the input device of the first UE 102, second user input requesting invocation of a control function 114.

At 910, the first UE 102 may detect, after the invocation of the control function 114 and via the input device of the first UE 102, third user input requesting to type one or more second text characters.

At 912, the first UE 102 may display, on the display of the first UE 102 and based at least in part on the invocation of the control function 114 before the third user input was detected, the one or more second text characters within a second conversation bubble 108(3) designated for the first UE 102.

At 914, the first UE 102 may send, via the network interface of the first UE 102, and over the telecommunications network to the second UE, at least one second RTT packet of the multiple RTT packets that are transmitted, without user intervention, at the predetermined frequency, the at least one second RTT packet carrying the one or more second text characters.

Figure 10:
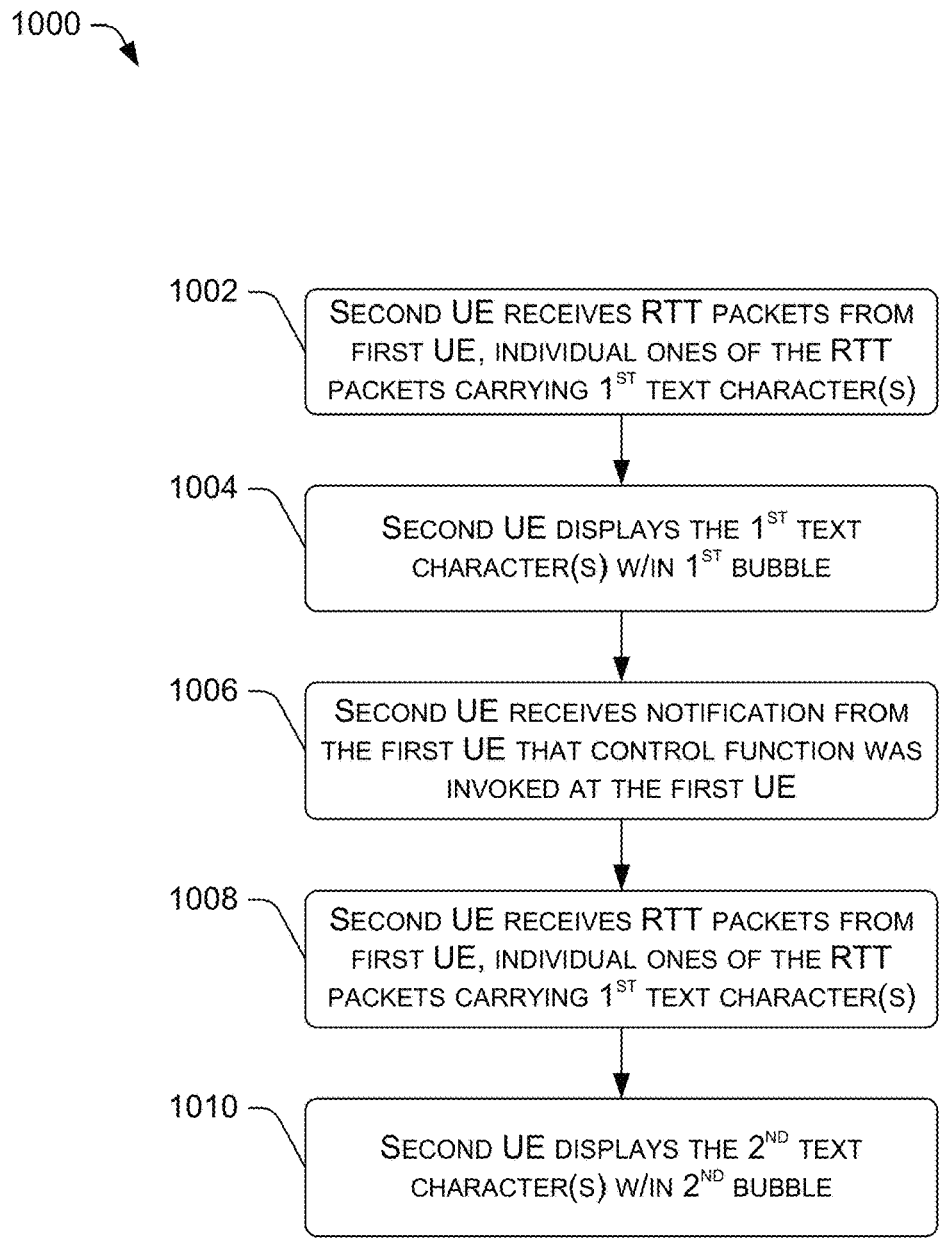
FIG. 10 illustrates a flowchart of an example process for partitioning RT content, and displaying, at a destination device, the partitioned RTT content within separate conversation bubbles based at least in part on a user invocation of a control function at a source device.

FIG. 10 illustrates a flowchart of an example process 1000 for partitioning RTF content, and displaying, at a destination device, the partitioned RTT content within separate conversation bubbles 108/208/308/408 based at least in part on a user invocation of a control function 114/214/314/414 at the source device. The process 1000 may be implemented by any of the RT-capable UEs described herein acting as a destination device that is receiving RTT content from a source device. For illustrative purposes, the process 1000 will be described with reference to the elements shown in FIG. 5, but it is to be appreciated that elements of FIG. 5 that are referenced in the process 1000 may be replaced with any of the other elements with like reference numerals, or that are described similarly in other figures. For example, the first UE 502 referenced in FIG. 10 may be replaced with other first UEs 102/202/302/402/702/802 described herein. The process 1000 is described, by way of example, with reference to the previous figures.

At 1002, during a RTT communication session established between a first UE 502 and a second UE 500, the second UE 500 may receive, via a network interface of the second UE 500, and over a telecommunications network 504 from a first UE 502, at least one first RT packet of multiple RT packets (e.g., the RT packets 512) that are transmitted from the first UE 502, without user intervention, at a predetermined frequency. The at least one first RTT packet carries one or more first text characters typed by a user of the first UE 502.

At 1004, the second UE 500 may display, on a display of the second UE 500, the one or more first text characters within a first conversation bubble 108/208/308/408 designated for the first UE 502.

At 1006, the second UE 500 may receive, via the network interface of the second UE 500, and over the telecommunications network 504 from the first UE 502, a notification that a control function 114/214/314/414 was invoked at the first UE 502. This notification can be received in various forms described herein, such as in the form of a m-bit 514 received in an incoming RTT packet with new RTT content, a RT packet carrying a non-displayable control character, a RTT packet carrying no text characters and sent along with a m-bit 514, or a silent packet (no text characters or control characters) sent along with a m-bit 514, or the like.

At 1008, the second UE 500 may receive, via the network interface of the second UE 500, and over the telecommunications network 504 from the first UE 502, at least one second RTT packet of the multiple RTT packets (e.g., the RTT packets 532) that are transmitted from the first UE 502, without user intervention, at the predetermined frequency. The at least one second RTT packet carries one or more second text characters typed by the user of the first UE 502.

At 1010, the second UE 500 may display, on the display of the second UE 500 and based at least in part on the notification that the control function 114/214/314/414 was invoked at the first UE 502 before the receiving of the at least one second RTT packet at 1008, the one or more second text characters within a second conversation bubble 108/208/308/408 designated for the first UE 502.

Figure 11:
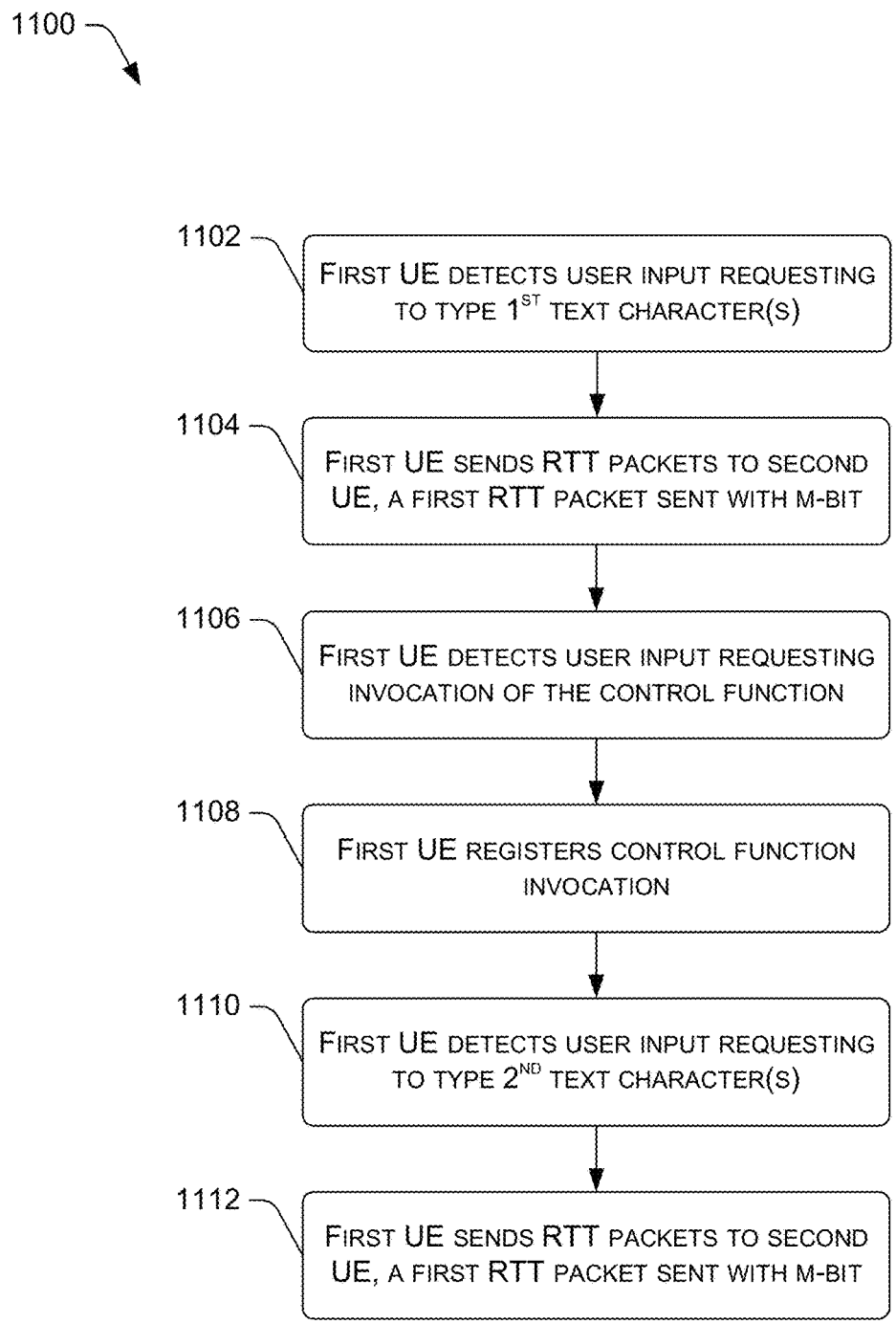
FIG. 11 illustrates a flowchart of an example process for using a m-bit with a RTT packet carrying one or more text characters to notify a destination device of a control function invocation at a source device.

FIG. 11 illustrates a flowchart of an example process 1100 for using a m-bit 514 with a RTT packet carrying one or more text characters to notify a destination device of a control function invocation at a source device.

At 1102, during a RTT communication session between a first UE 102 and a second UE (e.g., the second UE 500/700/800), the first UE 102 may detect, via an input device of the first UE 102, first user input requesting to type one or more first text characters.

At 1104, before, during, or after displaying the first text character(s) on a display of the first UE 102, the first UE 102 may send, via a network interface of the first UE 102, and over a telecommunications network to the second UE involved in the RTT communication session, multiple RTT packets (e.g., the RTT packets 512) that are transmitted, without user intervention, at a predetermined frequency. A first RTT packet sent at 1104 is sent with a m-bit 514 and carries at least a first text character of the first text character(s), while the following RTT packets sent at 1104 carry the remaining text character(s) and do not include the m-bit 514.

At 1106, the first UE 102 may detect, after sending the RTT packets at 1104, and via the input device of the first UE 102, second user input requesting invocation of a control function 114.

At 1108, the first UE 102 may register the invocation of the control function 114 and wait for additional user input requesting to type additional text characters.

At 1110, the first UE 102 may detect, after the invocation of the control function 114 and via the input device of the first UE 102, third user input requesting to type one or more second text characters. At 1112, before, during, or after displaying the first text character(s) on a display of the first UE 102, the first UE 102 may send, via a network interface of the first UE 102, and over a telecommunications network to the second UE, multiple RTT packets (e.g., the RTT packets 532) that are transmitted, without user intervention, at a predetermined frequency. A first RIT packet sent at 1112 is sent with a m-bit 514 and carries at least a first text character of the second text character(s), while the following RUT packets sent at 1112 carry the remaining text character(s) and do not include the m-bit 514. This m-bit 514 at block 1112 acts as a notification that the control function was invoked at the first UE 102 at block 1106

Figure 12:
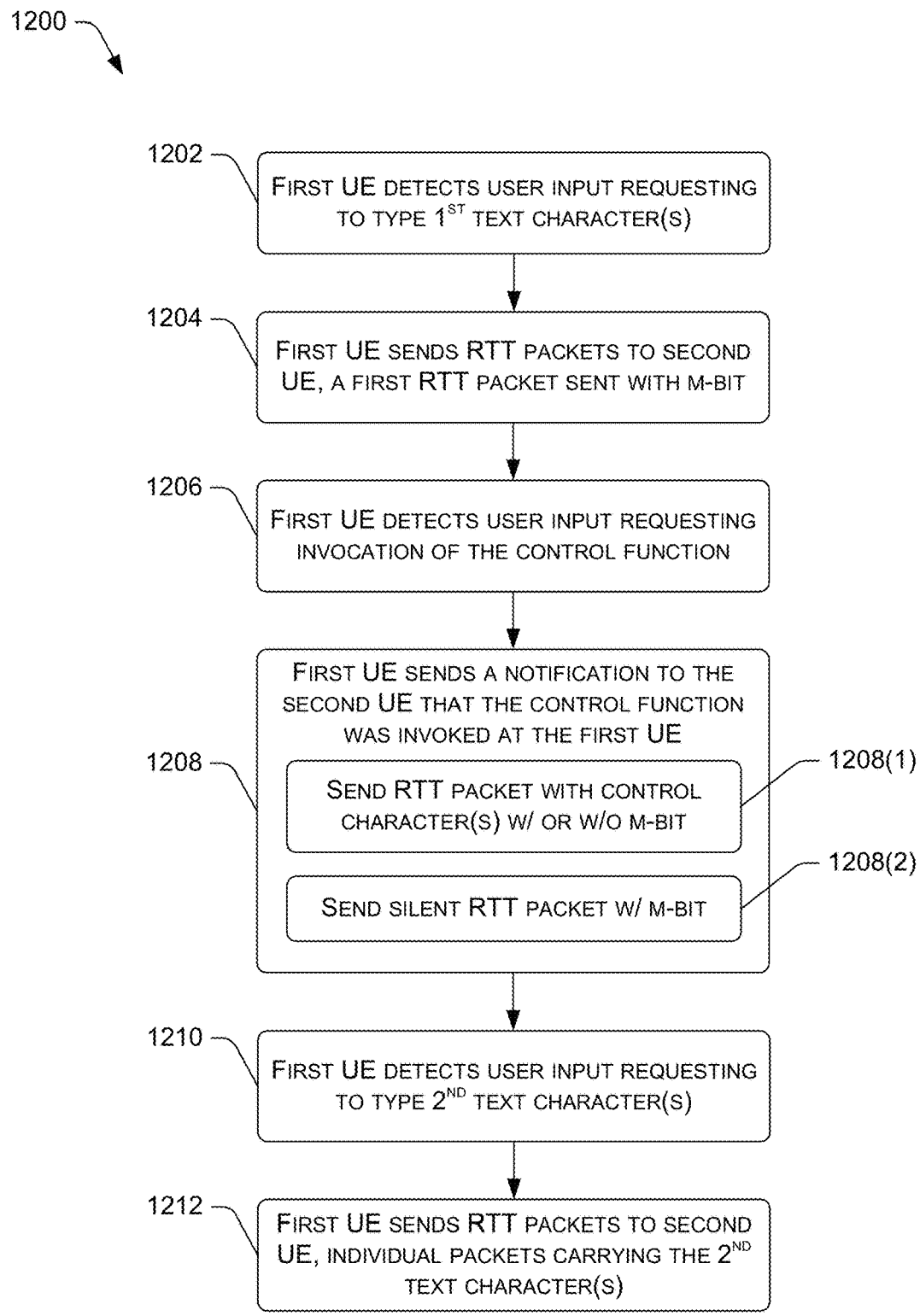
FIG. 12 illustrates a flowchart of an example process for notifying a destination device of a control function invocation at a source device before transmission of new RTT content.

FIG. 12 illustrates a flowchart of an example process 1200 for notifying a destination device of a control function invocation at a source device before transmission of new RT content.

At 1202, during a RTT communication session between a first UE 102 and a second UE (e.g., the second UE 500/700/800), the first UE 102 may detect, via an input device of the first UE 102, first user input requesting to type one or more first text characters.

At 1204, before, during, or after displaying the first text character(s) on a display of the first UE 102, the first UE 102 may send, via a network interface of the first UE 102, and over a telecommunications network to the second UE involved in the RT communication session, multiple RTT packets (e.g., the RTT packets 512) that are transmitted, without user intervention, at a predetermined frequency. A first RT packet sent at 1204 is sent with a m-bit 514 and carries at least a first text character of the first text character(s), while the following RTT packets sent at 1204 carry the remaining text character(s) and do not include the m-bit 514.

At 1206, the first UE 102 may detect, after sending the RT packets at 1204, and via the input device of the first UE 102, second user input requesting invocation of a control function 114.

At 1208, the first UE 102 may send, via the network interface of the first UE 102, and over the telecommunications network to the second UE, a notification that the control function 114 was invoked at the first UE. As shown by block 1208(1), the sending of the notification can occur by sending a RTT packet carrying one or more control characters without a m-bit, or sending the RTT packet carrying one or more control characters with a m-bit 514 included in the RTT packet. The RTT packet sent at block 1208(1) may not carry any text characters. The control character(s) at block 1208(1) may not be displayable, and, in this manner, the control character(s) may be discarded (i.e., not displayed) by the second UE upon receipt at the second UE. As shown by block 1208(2), the sending of the notification can occur by sending a "silent" RTT packet carrying no control characters or text characters, but including a m-bit 514.

At 1210, the first UE 102 may detect, after the invocation of the control function 114 and via the input device of the first UE 102, third user input requesting to type one or more second text characters.

At 1212, before, during, or after displaying the first text character(s) on a display of the first UE 102, the first UE 102 may send, via a network interface of the first UE 102, and over a telecommunications network to the second UE, multiple RT packets (e.g., the RTT packets 532) that are transmitted, without user intervention, at a predetermined frequency. At least one of the RTT packets sent at block 1212 carries the second text character(s), and these RTT packets may not include a m-bit 514 due to the fact that a notification was sent at block 1208 to indicate to the second UE that a new conversation bubble is to be created for the second text character(s).

Figure 13:
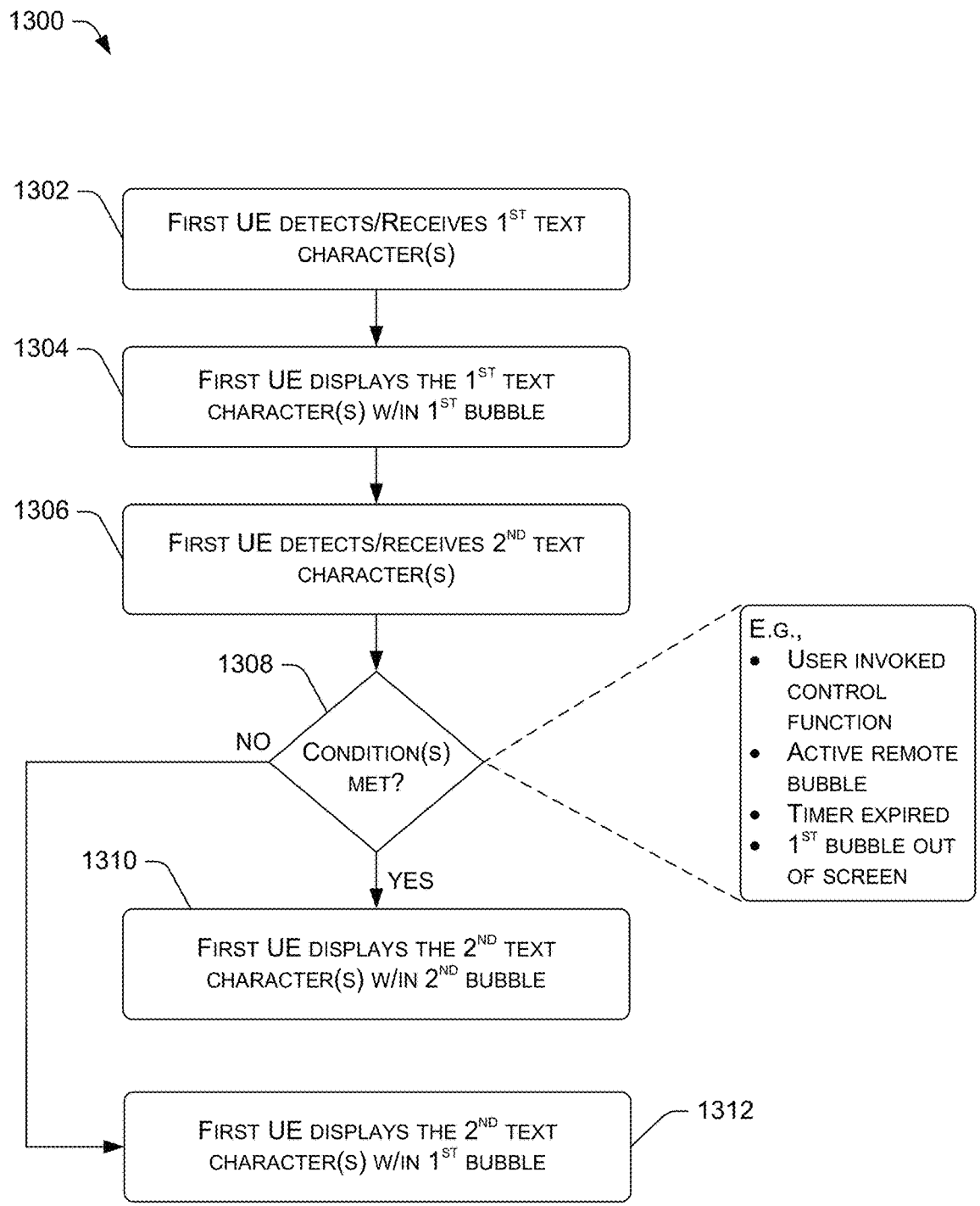
FIG. 13 illustrates a flowchart of an example process for partitioning RT content, and displaying the partitioned RTT content within separate conversation bubbles based at least in part on one or more conditions being met.

FIG. 13 illustrates a flowchart of an example process 1300 for partitioning RTT content, and displaying the partitioned RTT content within separate conversation bubbles based at least in part on one or more conditions being met.

At 1302, during a RTT communication session established between a first UE 102 and a second UE, a first UE 102 may detect user input requesting to type, or may receive multiple RTT packets carrying, one or more first text characters.

At 1304, the first UE 102 may display, on a display of the first UE 102, the first text character(s) within a first conversation bubble. Depending on whether the first text character(s) were input at the first device 102 or received via a RTT packet(s) over the telecommunications network, the first conversation bubble may be designated for a particular UE and/or user of the communication session.

At 1306, the first UE 102 may detect user input requesting to type, or may receive multiple RTT packets carrying, one or more second text characters.

At 1308, the first UE 102 may determine whether one or more conditions are met at a time of detecting/receiving the second text character(s) at block 1306. For example, as described with respect to FIG. 9, a condition may be met at block 1308 if a user who typed the first and second text characters also invoked a control function between typing the first and second text character(s).

Additionally, or alternatively, a second condition may be met at block 1308 if the first UE 102 determines a presence of conversation bubbles 108/208/308/408 associated with both UEs on the display of the first UE 102. In other words, if the first UE 102, at 1302 and 1306, detects the input of first and second text characters, respectively, which were typed by a local user of the first UE 102, a condition is met at block 1308 if the first UE 102 determines a presence of a conversation bubble 108/208/308/408 designated for the second UE (or a remote user thereof) on a display of the first UE 102 at the time of detecting the user input requesting to type the second text character(s) at block 1306. This works in the opposite direction as well. For example, if the first UE 102, at 1302 and 1306, receives first and second text characters, respectively, which were typed by a remote user of the second UE, a condition is met at block 1308 if the first UE 102 determines a presence of a conversation bubble 108/208/308/408 designated for the first UE 102 (or a local user thereof) on a display of the first UE 102 at the time of receiving the RTT packets carrying the second text character(s) at block 1306.

Additionally, or alternatively, a third condition may be met at block 1308 if a timer expired at the time when the first UE 102 detects/receives the second text character(s) at block 1306. The time period may be measured from a time when first text characters are detected/received at block 1302 to a time when second text characters are detected/received at block 1306. Alternatively, the time period may be measured from a time when text characters from a second UE are received to a time when the first device 102 detects input of the second text characters at block 1306, or the time period may be measured from a time when input of text characters is detected at the first UE 102 to a time when the second text characters are received at block 1306 from a second device. If any of these time periods were to exceed a threshold time period, the condition is met at block 1308.

Additionally, or alternatively, a fourth condition may be met at block 1308 if the first conversation bubble of block 1304 has moved out of screen (e.g., outside of a defined boundary of a RTT conversation area 406) at a time when the second text character(s) are detected/received at block 1306. For example, another conversation bubble displayed below the first conversation bubble may, due to the size of the other conversation bubble, push the first conversation bubble outside of the defined boundary of the RTT conversation area 406, and when this occurs at a time that the second text character(s) are detected/received at block 1306, the condition is met at block 1308.

In the event than any one, or multiple ones, of the conditions described herein are met at block 1308, the process 1300 follows the "yes" route from block 1308 to block 1310 where the first UE 102 displays the second text character(s) within a second conversation bubble 108/208/308/408, different from the first conversation bubble 108/208/308/408 that contains the first text character(s). If, on the other hand, any or all of the conditions are not met at block 1308, the process 1300 follows the "no" route from block 1308 to block 1312, where the first UE 102 displays the second text character(s) within the same, first conversation bubble 108/208/308/408 that contains the first text character(s).

Figure 14:
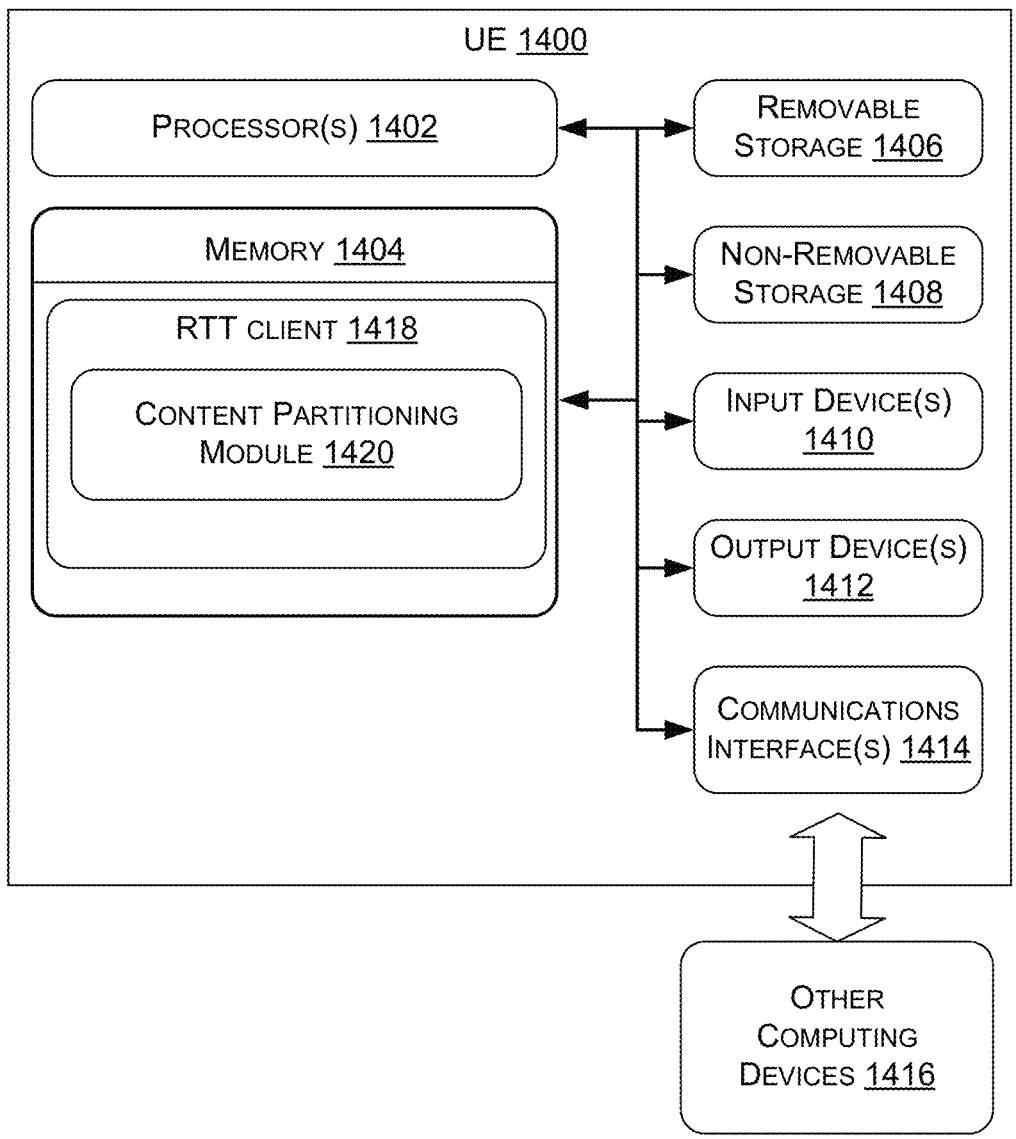
FIG. 14 is a block diagram of an example UE configured to partition RTT content, and display the partitioned RIT content within separate conversation bubbles.

FIG. 14 is a block diagram of an example UE 1400 configured to partition RTT content, and display the partitioned RTT content within separate conversation bubbles. The UE 1400 may be representative of the UE's described herein.

As shown, the UE 1400 may include one or more processors 1402 and one or more forms of computer-readable memory 1404. The UE 1400 may also include additional storage devices. Such additional storage may include removable storage 1406 and/or non-removable storage 1408.

The UE 1400 may further include input devices 1410 (e.g., touch screen, microphone(s)) communicatively coupled to the processor(s) 1402 and the computer-readable memory 1404. The user input described herein may be detected via the input device(s) 1410, as described herein. The UE 1400 may further include output devices 1412 (e.g., a display) communicatively coupled to the processor(s) 1402 and the computer-readable memory 1404. The UE 1400 may further include communications interface(s) 1414 (or network interface(s) 1414) that allow the UE 1400 to communicate with other computing devices 1416 (e.g., IMS nodes, other UEs) such as via a network. The communications interface(s) 1414 may facilitate transmitting and receiving wired and/or wireless signals over any suitable communications/data technology, standard, or protocol, as described herein. For example, the communications interface(s) 1414 can comprise one or more of a cellular radio, a wireless (e.g., IEEE 802.1x-based) interface, a Bluetooth® interface, and so on. In some embodiments, the communications interface(s) 1414 may include radio frequency (RF) circuitry that allows the UE 1400 to transition between different RATs, such as transitioning between communication with a 4G or 5G LTE RAT and a legacy RAT (e.g., 3G/2G). The communications interface(s) 1414 may further enable the UE 1400 to communicate over circuit-switch domains and/or packet-switch domains.

In various embodiments, the computer-readable memory 1404 comprises non-transitory computer-readable memory 1404 that generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 1404 may also be described as computer storage media and may include volatile and nonvolatile, removable and non-removable media implemented in any method or technology for storage of information, such as computer readable instructions, data structures, program modules, or other data. Computer-readable memory 1404, removable storage 1406 and non-removable storage 1408 are all examples of non-transitory computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the UE 1400. Any such computer-readable storage media may be part of the UE 1400.

The memory 1404 can include a RTT client 1418 including a content partitioning module 1420 (i.e., computer-executable instructions (or logic)) that, when executed, by the processor(s) 1402, perform the various acts and/or processes disclosed herein.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

What is claimed is:

1. A user equipment (UE) comprising:
    a processor;
    an input device;
    a network interface;
    a display; and
    memory storing computer-executable instructions that, when executed by the processor, cause the UE to, during a real time text (RTT) communication session:
        detect, via the input device, a first user input generating first RTT content;
        display, on the display, the first RTT content with a designation for the first UE;
        send, without user intervention and in response to a predetermined event, at least one first RTT packet of multiple RTT packets to a second UE, the at least one first RTT packet comprised of the first RTT content;
        detect, after sending the at least one first RTT packet and via the UE, a second user input invoking a control mechanism;
        detect a third user input generating second RTT content;
        display, on the display and based at least in part on the control mechanism, the second RTT content, separate from the first RTT content, with the designation for the UE; and
        send, without user intervention, at least one second RTT packet of the multiple RTT packets to the second UE, the at least one second RTT packet comprised of a marked bit (m-bit), the m-bit configured to indicate that the control mechanism was invoked.

2. The UE of claim 1, wherein the computer-executable instructions, when executed by the processor, further cause the UE to:

receive, after sending the at least one first RTT packet, at least one received RTT packet associated with the second UE and including received RTT content; and display, on the display, the received RTT content with an additional designation for the second UE.

3. The UE of claim 1, wherein the at least one second RTT packet is configured to transmit the second RTT content to the second UE and the m-bit is configured as a notification that the control mechanism was invoked at the UE.

4. The UE of claim 3, wherein the at least one second RTT packet is further configured as a RTT packet carrying one or more control characters with the m-bit included in the RTT packet.

5. The UE of claim 1, wherein the computer-executable instructions, when executed by the processor, further cause the UE to:

receive, from the second UE, a RTT packet carrying RTT content generated by a user of the second UE;

detect, via the input device, fourth user input generating third RTT content;

determine that a time period from receiving the RTT packet to detecting the fourth user input exceeds a threshold time period;

display, based at least in part on the time period exceeding the threshold time period, the third RTT content, separate from the first RTT content and the second RTT content, with the designation for the UE; and send, without user intervention and in response to the predetermined event, at least one third RTT packet of the multiple RTT packets to the second UE, the at least one third RTT packet comprised of the third RTT content.

6. The first UE of claim 1, wherein the computer-executable instructions, when executed by the processor, further cause the UE to:

receive, before detecting the first user input, at least one received RTT packet carrying third RTT content generated by a user of the second UE;

display, before detecting the first user input, the third RTT content with a designation for the second UE;

receive, after sending the at least one first RTT packet, at least one additional received RTT packet carrying fourth RTT content generated by the user of the second UE;

determine the third RTT content has moved outside a defined boundary of a RTT conversation area; and display, based at least in part on the third RTT content having moved outside of the defined boundary of the RTT conversation area, the fourth RTT content, separate from the third RTT content, with the designation for the second UE.

7. The first UE of claim 1, wherein:

the input device comprises a touch screen;

the control mechanism is visually represented on the display during the RTT communication session by a selectable element presented on the display; and detecting the second user input invoking the control mechanism comprises detecting, based on touch input received via the touch screen, a selection of the selectable element.

8. A method to be implemented by a first user equipment (UE), during a real time text (RTT) communication session, the method comprising:

detecting, via an input device associated with the first UE, one or more first user inputs;

sending, without user intervention and at a predetermined frequency, at least one first RTT packet of multiple RTT packets, the at least one first RTT packet comprising at least a first user input of the one or more first user inputs;

detecting, via the input device, one or more second user inputs;

determining, based at least in part on the one or more first user inputs and the one or more second user inputs, whether a control mechanism has been satisfied; and sending, without user intervention and at a predetermined frequency, at least one second RTT packet of the multiple RTT packets, the at least one second RTT packet comprising at least a second user input of the one or more second user inputs and a market bit (m-bit) configured as a notification that the control mechanism is satisfied at the first UE.

9. The method of claim 8, wherein determining whether the control mechanism has been satisfied comprises:

detecting, via the input device and after sending the at least one first RTT packet, an indication of a control function, the control function comprising at least one of:

a soft button, displayed by the first UE and selectable by a user of the first UE, including an identifying characteristic;

a hard button, included by the first UE and selectable by the user; or a voice command, detectable by the UE and determined by the user.

10. The method of claim 9, wherein determining whether the control mechanism has been satisfied further comprises:

receiving, from a second UE and after sending the at least one first RTT packet, at least one received RTT packet, the at least one received RTT packet including one or more received inputs; and determining that a time period between receiving the at least one received RTT packet and detecting the one or more second user inputs exceeds a time period threshold.

11. The method of claim 8, further comprising:

determining, by the first UE and prior to detecting the one or more first user inputs, that a second UE is not RTT-capable, but is RTT-to-teletypewriter (TTY) capable;

establishing the RTT communication session as a TTY communication session with RTT-to-TTY transcoding; and sending, prior to the at least one second RTT packet and based at least in part on the second UE being TTY-capable, a RTT packet carrying one or more displayable text characters indicating that the control mechanism has been invoked at the first UE.

12. The method of claim 11, wherein the first UE determines that the second UE is not RTT-capable, but is TTY-capable based at least in part on an omission of a feature tag from a Session Initiation Protocol (SIP) response received by the first UE, the feature tag omitted from the SIP response being used to indicate that the second UE supports at least text content exchange via RTT messages.

13. The method of claim 8, wherein determining whether a control mechanism has been satisfied comprises:

determining, based at least on the control mechanism being satisfied, that the notification is to be provided via the at least one second RTT packet; and setting the m-bit in the at least one second RTT packet.

14. A system comprising:
a processor; and
a memory storing computer-executable instructions that, when executed by the processor, cause the processor to execute operations comprising:
receiving, via a first input device associated with a first user equipment (UE), one or more first user inputs;
sending, without user intervention and at a predetermined frequency, a first RTT packet of multiple RTT packets to a second UE, the first RTT packet comprising at least a first user input of the one or more first user inputs;
receiving, via a second input device associated with the second UE, one or more second user inputs;
receiving, via the first input device, one or more third user inputs
determining, based at least in part on the one or more first user inputs and the one or more third user inputs, whether a control mechanism has been satisfied; and
sending, without user intervention and at the predetermined frequency, a second RTT packet of the multiple RTT packets, the second RTT packet comprising at least a third user input of the one or more third user inputs and a marker bit (m-bit) configured as a notification that the control mechanism is satisfied at the first UE.

15. The system of claim 14, the operations further comprising:
determining, based at least in part on the one or more second user inputs, whether an additional control mechanism has been satisfied; and
sending, without user intervention, a third RTT packet comprising at least a second user input of the one or more second user inputs and an additional m-bit configured as an additional notification that the additional control mechanism is satisfied at the second UE.

16. The system of claim 14, further comprising:
determining, prior to receiving the one or more first user inputs, that the second UE is unassociated with RTT communications and that the second UE is RTT-to-teletypewriter (TTY) capable;
establishing a TTY communication session with RTT-to-TTY transcoding between the first UE and the second UE; and
sending, prior to the second RTT packet and based at least in part on the second UE being TTY-capable, a RTT packet carrying one or more displayable text characters and the m-bit indicating that the control mechanism has been invoked at the first UE.

17. The system of claim 16, wherein the second UE is determined to be unassociated with RTT communication and TTY capable based at least in part on an omission of a feature tag from a Session Initiation Protocol (SIP) response received from the second UE, the feature tag omitted from the SIP response being used to indicate that the second UE supports at least text content exchange via RTT messages.

18. The system of claim 14, wherein determining whether the control mechanism has been satisfied comprises:
detecting, via the first input device and after sending the first RTT packet, an indication of a control function, the control function comprising at least one of:
a soft button, displayed by the first UE and selectable by a user of the first UE, including an identifying characteristic;
a hard button, included by the first UE and selectable by the user; or
a voice command, detectable by the first UE and determined by the user.

19. The system of claim 18, wherein determining whether the control mechanism has been satisfied further comprises determining whether the indication of the control function is associated with an event, the event comprising at least one of:
sending a third RTT packet from the second UE to the first UE;
detecting the one or more third user inputs; and
determining that the user has finished the one or more first user inputs.

20. The system of claim 18, wherein determining whether the control mechanism has been satisfied further comprises determining whether the indication of the control function is associated with the one or more third user inputs being moved from a first location at least partially within a RTT conversation area to a second location outside the RTT conversation area.

* * * * *